(12) United States Patent
Bober et al.

(10) Patent No.: US 11,274,952 B2
(45) Date of Patent: Mar. 15, 2022

(54) ULTRASONIC MEASURING DEVICE FOR ULTRASONIC MEASUREMENT ON A FLOWING FLUID

(71) Applicant: Levitronix GmbH, Zürich (CH)

(72) Inventors: Maciej Bober, Utting am Ammersee (DE); Edgar Hoffmann, Hofstetten (DE)

(73) Assignee: LEVITRONIX GMBH, Zurich (CH)

( * ) Notice: Subject to any disclaimer, the term of this patent is extended or adjusted under 35 U.S.C. 154(b) by 0 days.

(21) Appl. No.: 16/662,658

(22) Filed: Oct. 24, 2019

(65) Prior Publication Data

US 2020/0158693 A1 May 21, 2020

(30) Foreign Application Priority Data

Nov. 16, 2018 (EP) ..................................... 18206814

(51) Int. Cl.
*G01F 1/66* (2006.01)
*G01N 29/22* (2006.01)
(Continued)

(52) U.S. Cl.
CPC ............... *G01F 1/662* (2013.01); *G01F 1/667* (2013.01); *G01N 29/222* (2013.01); *G01N 9/24* (2013.01);
(Continued)

(58) Field of Classification Search
None
See application file for complete search history.

(56) References Cited

U.S. PATENT DOCUMENTS 3,738,169 A 6/1973 Courty
4,103,551 A * 8/1978 Lynnworth ............. G01F 1/662
73/861.27
(Continued)

FOREIGN PATENT DOCUMENTS

DE 10 2011 084171 A1 5/2012
EP 2 508 851 A1 10/2012
WO WO-2017182282 A1 * 10/2017 ........... G01N 29/265

OTHER PUBLICATIONS

Extended European Search Report dated May 31, 2019 in corresponding European Patent Application No. 18206814.8, filed Nov. 16, 2018.
(Continued)

*Primary Examiner* — Harshad R Patel
(74) *Attorney, Agent, or Firm* — Global IP Counselors, LLP

(57) ABSTRACT

An ultrasonic measuring includes a housing having a measuring channel and ultrasonic transducers. The housing is releasable attached to a pipe such that the measuring channel is capable of receiving the pipe and fixing the pipe with respect to the housing. The ultrasonic transducers emit and receive ultrasonic signals, and include first and second ultrasonic transducers. The first ultrasonic transducers define a first measuring section so as to be capable of exchanging ultrasonic signals, and the second ultrasonic transducers define a second measuring section so as to be capable of exchanging ultrasonic signals. The ultrasonic transducers are aligned such that the first and second measuring sections extend obliquely to a flow direction, and such that a measuring plane is defined by a center axis of the measuring channel and is different from a measuring plane defined by the center axis of the measuring channel and the second measuring section.

14 Claims, 12 Drawing Sheets

(51) Int. Cl.
  *G01F 1/667* (2022.01)
  *G01N 9/24* (2006.01)
  *G01N 11/04* (2006.01)
  *G01N 29/024* (2006.01)
  *G01N 29/032* (2006.01)
(52) U.S. Cl.
  CPC ............ *G01N 11/04* (2013.01); *G01N 29/024* (2013.01); *G01N 29/032* (2013.01); *G01N 2291/011* (2013.01); *G01N 2291/015* (2013.01); *G01N 2291/022* (2013.01); *G01N 2291/02818* (2013.01); *G01N 2291/02836* (2013.01)

(56) References Cited

U.S. PATENT DOCUMENTS

| | | | | |
|---|---|---|---|---|
| 4,454,767 A | * | 6/1984 | Shinkai | G01F 1/662 |
| | | | | 73/861.18 |
| 4,462,261 A | * | 7/1984 | Keyes | G01F 1/86 |
| | | | | 73/861.02 |
| 6,877,387 B1 | * | 4/2005 | Certon | G01F 1/712 |
| | | | | 73/861.29 |
| 10,031,011 B2 | * | 7/2018 | Ferencz | G01F 15/14 |
| 2006/0052963 A1 | * | 3/2006 | Shkarlet | G01F 1/668 |
| | | | | 702/108 |
| 2007/0186681 A1 | * | 8/2007 | Shkarlet | A61B 5/6876 |
| | | | | 73/861.28 |
| 2011/0277558 A1 | * | 11/2011 | Dietz | G01F 1/667 |
| | | | | 73/861.31 |
| 2012/0055264 A1 | * | 3/2012 | Sinha | G01F 1/663 |
| | | | | 73/861.25 |
| 2013/0180341 A1 | * | 7/2013 | Murakami | G01F 1/662 |
| | | | | 73/861.18 |
| 2019/0154480 A1 | * | 5/2019 | Schob | G01F 1/662 |

OTHER PUBLICATIONS

Hahn, "Press Release: New Leviflow: Flow Sensor Series for Single-Use Applications from Levitronix", XP055589717, Sep. 15, 2015, 3 pages.

* cited by examiner

ULTRASONIC MEASURING DEVICE FOR ULTRASONIC MEASUREMENT ON A FLOWING FLUID

CROSS-REFERENCE TO RELATED APPLICATION

This application claims priority to European Patent Application No. 18206814.8, filed Nov. 16, 2018, the content of which is hereby incorporated herein by reference.

BACKGROUND

Field of the Invention

The invention relates to an ultrasonic measuring device for measurement on a fluid flowing in a pipe.

Background Information

Ultrasonic measuring devices for measurement on a fluid flowing in a pipe are used for example to determine the flow of the fluid through a pipe, for example a flexible plastic hose. It is a known measure to design the measuring device as a clamping device in such a way that it can be clamped onto a flexible pipe or that the pipe is clamped by the measuring device. The pipe with the fluid flowing in it is then applied with ultrasonic signals. After passing through the pipe and the fluid, the ultrasonic signals are received by an ultrasonic transducer and the received signal is evaluated.

SUMMARY

This non-invasive method of measurement on a flowing fluid is used in particular for such high-purity or very sensitive fluids, in which contact between the fluid and the measuring device is to be avoided, so that the fluid is not contaminated, for example. The pharmaceutical and biotechnology industries are examples of this. Here, solutions and suspensions are often produced and conveyed which place very high demands on the purity and/or the integrity of the fluid. In many cases, such fluids even have to be treated under sterile conditions. Further examples for the application of such non-invasive measurements on a flowing fluid can be found in medicine or in the food industry. Non-invasive measurements on flowing fluids are also used in the semiconductor industry. Here, it is a further aspect that the substances to be measured are often chemically highly aggressive, for example the substances are acids or alkalis such as sulfuric acid, hydrochloric acid, nitric acid or ammonia water.

Such an ultrasonic measuring device, which is particularly suitable for the non-invasive measurement of high purity substances, is the flow meter designed as a clamping device, which is offered and distributed by the applicant under the trade name LEVIFLOW. This ultrasonic measuring device has two housing parts being connected to each other by an articulated joint. In the open state, the flexible or deformable pipe on which the measurement is to be made is inserted into the housing. The two housing parts are then folded together and fixed together, so that the pipe is fixed in the housing by a clamping connection. Two ultrasonic transducers are disposed in the housing, each of which can emit and receive an ultrasonic signal. Thereby, a first ultrasonic transducer is arranged on one side of the clamped pipe and a second ultrasonic transducer on the other side of the pipe.

The two ultrasonic transducers are arranged offset with respect to the flow direction of the fluid and aligned in such a way that the first ultrasonic transducer can receive a signal emitted by the second ultrasonic transducer, and the second ultrasonic transducer can receive a signal emitted by the first ultrasonic transducer. Due to the offset to each other, the two ultrasonic transducers are aligned in such a way that they emit in each case their ultrasonic signals obliquely to the flow direction of the fluid, wherein the one ultrasonic transducer emits the signal obliquely with the flow direction, while the other ultrasonic transducer emits the signal obliquely against the flow direction. Now, a measuring signal is emitted by the first ultrasonic transducer, which is received by the second ultrasonic transducer, and then a measuring signal is emitted by the second ultrasonic transducer, which is received by the first ultrasonic transducer.

The measuring signal emitted obliquely in the flow direction is accelerated in the flow and the measuring signal emitted obliquely against the flow direction is decelerated by the flow. The transit time difference of the two measuring signals is proportional to the flow velocity of the fluid, so that the flow rate through the flexible pipe can be detected from this transit time difference.

Ultrasonic measuring devices for non-invasive flow measurement of fluids are also known, which have four ultrasonic transducers arranged in an X-shape. The measuring principle is the same. The four ultrasonic transducers form two pairs, each of which can exchange ultrasonic signals with each other. The ultrasonic transducers are arranged such that the ultrasonic signals are emitted obliquely to the flow direction, wherein each pair can measure in and against the flow direction. In turn, the flow rate can then be determined from the transit time differences.

Even though these types of ultrasonic measuring devices have proven themselves in practice, there is still room for improvement with regard to ever higher requirements, for example with regard to measuring accuracy or reproducibility of the measurements.

Starting from this state of the art, it is therefore an object of the invention to propose an ultrasonic measuring device for the measurement on a fluid flowing in a pipe, which allows a very accurate detection of parameters, which are dependent on the sound propagation in the fluid. In particular, the ultrasonic measuring device should also be suitable for detecting the flow rate of the fluid.

According to an embodiment of the invention, an ultrasonic measuring device for the measurement on a fluid flowing in a pipe is proposed, with a closable housing, which has a continuous measuring channel having a center axis defining a flow direction, wherein the housing is designed for a releasable attachment to the pipe in such a way that in the closed state of the housing, the measuring channel can receive the pipe and can fix it with respect to the housing, so that the fluid can flow through the measuring channel in the flow direction, wherein at least four ultrasonic transducers are further disposed in the housing for the respective emitting and receiving of ultrasonic signals, namely at least two first ultrasonic transducers and two second ultrasonic transducers, the first ultrasonic transducers forming a first pair of transducers and defining a first measuring section via which the two first ultrasonic transducers can exchange ultrasonic signals with each another, and the two second ultrasonic transducers forming a second pair of transducers and defining a second measuring section via which the two second ultrasonic transducers can exchange ultrasonic signals with each another, and wherein the ultrasonic transducers are further arranged and aligned in such a way that both the first measuring section and the second measuring section each extend obliquely to the flow direction, and wherein the ultrasonic transducers are arranged and aligned in such a way that a first measuring plane being defined by the center axis of the measuring channel and the first measuring section is different from a second measuring plane being defined by the center axis of the measuring channel and the second measuring section.

Thus, the ultrasonic measuring device according to an embodiment of the invention comprises at least four ultrasonic transducers, wherein two ultrasonic transducers each form a pair of transducers that can exchange ultrasonic signals obliquely to the flow direction. This means that the two ultrasonic transducers, which form a pair of transducers, are each arranged and aligned in such a way that the one ultrasonic transducer of the pair of transducers can receive a signal emitted by the other ultrasonic transducer of the same pair of transducers and, conversely, the other ultrasonic transducer can receive a signal emitted by the one ultrasonic transducer. In doing so, as already discussed above, a measuring signal can be received that was emitted obliquely to the flow direction and a measuring signal that was emitted obliquely against the flow direction. The flow velocity of the fluid can then be detected from the transit time difference of these two measuring signals.

Due to the fact, according to the embodiment, that the ultrasonic transducers are arranged in two different measuring planes, the measuring channel can be applied with ultrasound much better or much more homogeneously than the devices known from the state of the art, where all ultrasonic transducers are arranged in only one measuring plane. The measuring channel can be completely applied with ultrasound at least in a very good approximation with the ultrasonic measuring device according to the invention, resulting in a significantly more accurate and also better reproducible measurement. In this way, for example, the disturbing influence of inhomogeneous flow conditions in the measuring channel, which can be caused, for example, by local vortex buildup, is at least significantly reduced, if not completely eliminated. The at least approximately complete application of ultrasonic signals to the entire measuring volume thus leads to a significantly more accurate and reliable measurement. For this purpose, it is an essential aspect that the ultrasonic transducers are arranged in at least two different measuring planes.

A measurement plane refers to that plane which is defined by the center axis of the measuring channel and the direction vector of the measuring section. For a given ultrasonic transducer, the direction vector of the associated measuring section is usually the surface normal at the center of the emitting and receiving area of the ultrasonic transducer. This direction vector extends in the same direction as the sound vector of the ultrasonic transducer, which points in the main propagation direction of the ultrasonic signal emitted by the ultrasonic transducer. If the two ultrasonic transducers, which together form a pair of transducers, are arranged on different sides of the measuring channel, i.e. if the center axis of the measuring channel is arranged between these two ultrasonic transducers, then the associated measuring section, which together with the center axis defines the associated measuring plane, is the connecting line between the centers of the emitting and receiving surfaces of the two ultrasonic transducers.

The arrangements known from the state of the art, including those in which four ultrasonic transducers are provided, use only a single measuring plane, which means that the volume of the measuring channel is not completely applied with ultrasound during the respective measurement, because there are always areas in the measuring channel which are only very weakly or not at all applied with ultrasound. Therefore, the arrangement according to the invention, in which the ultrasonic sensors measure in at least two different measuring planes, allows a significantly better and more homogeneous application of ultrasound to the measuring channel and thus a much more accurate, stable and reliable measurement.

According to a preferred embodiment, at least six ultrasonic transducers are provided, namely the two first ultrasonic transducers, the two second ultrasonic transducers and two third ultrasonic transducers, the third ultrasonic transducers forming a third pair of transducers and defining a third measuring section via which the two third ultrasonic transducers can exchange ultrasonic signals with each other, and wherein the third ultrasonic transducers are arranged and aligned in such a way that a third measuring plane being defined by the center axis of the measuring channel and the third measuring section is different from the first measuring plane or different from the second measuring plane.

By using at least six ultrasonic transducers, which form three pairs of transducers, the accuracy and reliability of the measurement can be further increased.

With this embodiment, it is particularly preferred if the third measuring plane is different from the first measuring plane and different from the second measuring plane. This means that three different measuring planes are measured, each different from the other, which allows a particularly good and homogeneous application of ultrasound to the measuring channel.

According to a preferred embodiment, the measuring channel has an n-cornered cross-section perpendicular to its center axis in the closed state of the housing, and is bounded by n channel surfaces, wherein n is an integer, which is greater than or equal to four.

Due to the n-cornered cross-section of the measuring channel, the measuring channel is bounded exclusively by planar—i.e. non-curved—surfaces, namely the n channel surfaces. This means that the pipe inserted into the measuring channel is in as complete contact as possible with the channel surfaces after closing the housing. This has the advantage that empty spaces filled with air between the pipe and the channel surfaces of the measuring channel can be minimized or even completely avoided. Since air is a very poor ultrasonic conductor, the measuring accuracy can be increased by avoiding such air volumes. In addition, the planar, i.e. non-curved, channel surfaces allow a simpler or better feed of the respective ultrasonic signal into the measuring channel, because the ultrasonic waves then essentially only hit planar surfaces, but not curved surfaces or boundary surfaces. Furthermore, a lens effect is also avoided, a scattering or focusing of the ultrasonic signal or ultrasonic beam at the boundary surfaces passing the signal is at least significantly reduced or even completely avoided.

If n is equal to four, i.e. the measuring channel has a square cross-section perpendicular to its center axis, the measuring channel is preferably designed in such a way that that the pipe can be inserted into a V-shaped cross-section when the housing is open. This means that the measuring channel is designed such that, when the housing is open, it offers the largest possible opening for the pipe to be inserted. In contrast to a square design, in which the pipe must be inserted into a U-shaped cross-section of the measuring channel when the housing is open, the V-shaped design makes insertion much easier. If the pipe has to be inserted into a U-shaped cross-section of the measuring channel, this usually results in an unfavorable and asymmetrical deformation of the pipe, which can lead to inhomogeneous flow conditions. With the V-shaped design in the open state of the housing, it can also be avoided that the pipe must slide along vertically aligned channel surfaces.

If the measuring channel is designed with an n-cornered cross-section with n greater than four, the opening angle between adjacent channel surfaces is greater than 90° in each case, so that the same advantages result here as with the V-shaped design of the square measuring channel.

According to a particularly preferred embodiment, the measuring channel has an n-cornered cross-section perpendicular to its center axis in the closed state of the housing, and is bounded by n channel surfaces, wherein n is equal to six or equal to eight. By a hexagonal or octagonal design of the measuring channel, the negative influence of disturbing wall waves on the measurement can be at least drastically reduced. Such wall waves are sound signals that pass through the walls of the housing or the walls bounding the measuring channel from an emitting ultrasonic transducer to a receiving ultrasonic transducer without passing through the measuring channel. Such wall waves represent interference signals, which have a negative influence on the accuracy and reliability of the measurement. This interference can be at least drastically reduced with a hexagonal or octagonal geometry of the measuring channel.

The ultrasonic transducers are preferably arranged and aligned in such a way that they can apply ultrasonic signals to at least two different and non-parallel channel surfaces. This is particularly advantageous for as complete as possible application of ultrasound to the measuring channel. In this arrangement, each measuring plane is perpendicular to one of the channel surfaces.

With regard to as complete as possible application of ultrasound to the measuring volume, it is advantageous if the ultrasonic transducers are arranged and aligned in such a way that each pair of transducers can apply ultrasonic signals to a different channel surface in each case. In the case of a design with, for example, six ultrasonic transducers, a total of three different channel surfaces are then applied with ultrasound. Preferably, none of these three channel surfaces is parallel to any other of these three channel surfaces.

It is a further advantageous measure that the ultrasonic transducers are arranged and aligned in such a way that each ultrasonic transducer can apply ultrasonic signals to a different channel surface in each case. The number of channel surfaces applied with ultrasound is then equal to the number of ultrasound transducers. One possible arrangement is that the two ultrasonic transducers forming a pair of transducers, apply ultrasonic signals to parallel channel surfaces in each case.

According to a preferred embodiment, the number of ultrasonic transducers is equal to the number of channel surfaces. However, this is not necessarily the case.

It is further preferred measure that the two third ultrasonic transducers are arranged and aligned in such a way that the third measuring section extends perpendicular to the center axis of the measuring channel. The third measuring section can thus be used to emit and receive a measuring signal that progresses perpendicular to the direction of flow. This has the advantage that the transit time of this measurement signal—at least in a very good approximation—is independent of the flow velocity of the fluid in the pipe. Thus, this measurement signal can be used to detect parameters of the fluid, which are dependent on the speed of sound or the sound attenuation in the fluid. In doing so, the flexibility and the possible applications of the measuring device considerably increase. In addition, changes in the transit time and/or in the attenuation of the measuring signal progressing perpendicular to the direction of flow can be used to detect changes in the fluid, for example a change in the concentration of a component of the fluid.

Such embodiments are also possible in which at least two of the ultrasonic transducers are each equipped with a curved emitting and receiving surface. For this purpose, the ultrasonic transducers can be designed as ring segments or otherwise curved.

The ultrasonic measuring device is particularly preferred designed as a clamping device for a clamping connection with the pipe, with a first housing part and with a second housing part, the first housing part and the second housing part being connected to each other in an articulated manner by a joint, and together bounding the measuring channel in the closed state of the housing. In the open state, the pipe can then be inserted into the measuring channel. The two housing parts are then simply folded together and locked together, so that in this closed state the ultrasonic measuring device is clamped on the pipe, whereby the pipe is fixed with respect to the housing.

According to a preferred embodiment, one of the two ultrasonic transducers of each pair of transducers is in each case arranged in the first housing part and the other of the two ultrasonic transducers is arranged in the second housing part. In this embodiment, one of the two ultrasonic transducers of each pair of transducers is in each case arranged laterally on one side of the measuring channel, and the other of the two ultrasonic transducers is arranged laterally on the other side of the measuring channel, so that the center axis of the measuring channel extends between these two ultrasonic transducers of the pair of transducers.

Particularly in this embodiment, it is preferred that the joint comprises a first joint part and a second joint part, wherein the first joint part is connected to the first housing part in a torque-proof manner and the second joint part is connected to the second housing part in a torque-proof manner, and wherein the first joint part and the second joint part are designed and arranged in such a way that at least one signal line can be guided from the first housing part through the interior of the joint parts to the second housing part.

According to another embodiment, either all ultrasonic transducers are arranged in the first housing part, or all ultrasonic transducers are arranged in the second housing part. The two ultrasonic transducers forming a pair of transducers, then in each case exchange ultrasonic signals via a reflection. For example, one of the first ultrasonic transducers emits a measuring signal along the first measuring section obliquely to the flow direction onto one of the channel surfaces. The measuring signal passes through the measuring channel obliquely to the flow direction, for example obliquely in the flow direction, is reflected at the opposite channel surface and then reaches the other of the two first ultrasonic transducers. This can also emit a measuring signal, which then runs obliquely against the flow direction, is reflected at the opposite channel surface, and is then received by the first mentioned of the two first ultrasonic transducers.

In this respect, it is also possible to provide additional reflectors on those channel surfaces where the ultrasonic signals are reflected.

Of course, mixed forms of these two embodiments are also possible, in which at least one pair of transducers exchanges ultrasonic signals to each other via reflection and another pair of transducers exchanges ultrasonic signals directly to each other, i.e. without reflection there between.

Another preferred measure is that, in the closed state of the housing, the measuring channel has an entrance area, a central area and an exit area, which are arranged one behind the other when viewed in the flow direction, the entrance area and the exit area each having a circular cross-section perpendicular to the center axis, the central area having an n-cornered cross-section perpendicular to the center axis, wherein n is an integer greater than or equal to four, and wherein the n-cornered cross-section of the central area continuously merges into the circular cross-section of both the entrance area and the exit area.

Due to the circumferential and smooth transition from the round cross-section of both the entrance area and the exit area to the n-cornered cross-section of the central area at which the measurement is made, an abrupt change in the cross-section of the pipe inserted into the measuring channel is avoided. This leads to a particularly homogeneous flow of the measuring volume in the measuring channel. All partial flow vectors are guided on ordered paths past the ultrasonic transducers. Due to the smooth cross section change, undesired turbulences or other unfavorable flow conditions in the measuring channel are avoided.

For ultrasonic measurement of a fluid flowing through the pipe, for example, the procedure is as follows, for example:
- Inserting the pipe into the measuring channel of the ultrasonic measuring device
- Attaching the housing of the ultrasonic measuring device to the pipe in such a way that the pipe is received in the measuring channel and fixed with respect to the housing;
- Emitting and receiving of measuring signals by the at least four ultrasonic transducers
- Transmitting the received measuring signals to an evaluation unit;
- Detecting at least one parameter, which depends on the sound propagation in the fluid, by the received measuring signals.

Preferably, the parameter is detected by the transit time of a measuring signal, or a transit time difference of two measuring signals, or by the attenuation of a measuring signal. Due to the fact that both the attenuation and the transit time of the measuring signals can be taken into account, the application range is extended. In addition, it is also possible to use the frequency or frequency shift of a measuring signal to detect the parameter or a parameter. The frequency shift of the measuring signal can be caused, for example, by the Doppler effect.

For example, one or more of the following parameters is/are detected:
flow rate of the fluid through the pipe, volume or mass fraction of a component of the fluid, concentration of a component contained in the fluid, a solids content in the fluid, optical density of the fluid, cell density in the fluid, viscosity of the fluid, physical density of the fluid, gas concentration in the fluid, change in the composition of the fluid.

As concrete examples may be mentioned here: the alcohol concentration, for example the methanol concentration, in the fluid in volume percent; the sodium hydroxide (NaOH) concentration in the fluid in volume percent; an enzyme or protein concentration in grams per liter in a biological fluid, for example the concentration of bovine serum albumin (BSA) or another globulin in water; the solids content in a suspension (slurry), for example in a suspension of silica ($SiO_2$) in water, or the cell density in a bioreactor, which is usually determined by the optical density, for example the optical density $OD_{600}$ in an *E. coli* cell suspension at a wavelength of 600 nm.

Further advantageous measures and embodiments of the invention result from the dependent claims.

BRIEF DESCRIPTION OF THE DRAWINGS

The invention will be explained in more detail hereinafter with reference to the drawings.

DETAILED DESCRIPTION OF THE EMBODIMENTS

Figure 1:
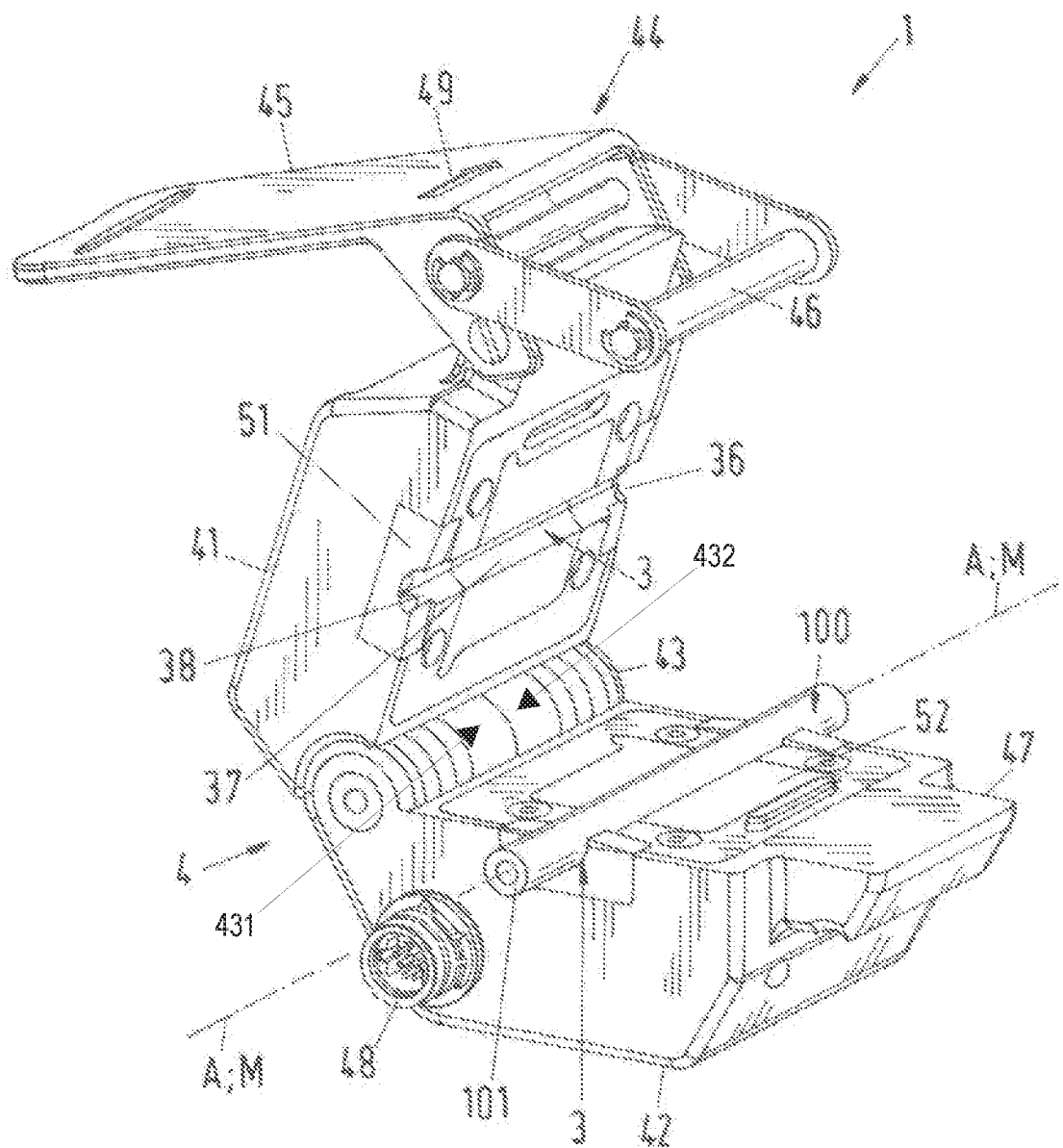
FIG. 1 is an embodiment of a design of the housing of an ultrasonic measuring device according to the invention.

FIG. 1 shows, in a perspective representation, an embodiment of a design of a housing of an ultrasonic measuring device according to the invention. This exemplary design can be used for all embodiments and their variants described below. The ultrasonic measuring device is designated as a whole with the reference sign 1 and the housing of the ultrasonic measuring device 1 is designated with the reference sign 4.

The ultrasonic measuring device 1 is preferably designed as a clamping device for a clamping connection with a pipe 100, i.e. the housing 4 of the ultrasonic measuring device 1 can be clamped onto the pipe 100 in such a way that the pipe 100 is fixed with respect to the housing 4. The basic design of the housing 4, which is represented in FIG. 1, is known per se, for example from the ultrasonic flow-meters, which are offered and sold by the applicant under the trade name LEVIFLOW.

In the following, reference is made to the case, which is particularly important in practice, where the pipe 100 is a flexible pipe 100, i.e. a pipe 100 whose wall 101 is deformable. The flexible pipe 100 is, for example, a plastic hose made of silicone rubber or PVC. Of course, the pipe 100 can also be made of other materials, in particular made of another plastic or a rubber. The pipe 100 can also be made of harder materials, but the pipe 100 should be deformable. In particular, such pipes 100 are suitable, which have Shore hardnesses from A10 to D93.

The housing 4 is designed as a closable housing 4 and comprises a first housing part 41 and a second housing part 42, which are connected to each other by an articulated joint 43. FIG. 1 shows the housing 4 in the open state. The housing 4 further has a continuous centrally arranged measuring channel 3, which extends through the entire housing 4 and serves to receive the pipe 100. The measuring channel 3 has a center axis M that defines a flow direction A in which a fluid flows through the pipe 100 or the housing 4.

The measuring channel 3 usually has an entrance area 36, a central area 37 and an exit area 38, which are arranged one behind the other when viewed in the flow direction A.

The housing 4 further has a closing mechanism 44 to close the housing 4 and thus to clamp the pipe 100 in the measuring channel 3. The closing mechanism 44 is arranged here on the first housing part 41 and comprises a bracket 46 and a folding strap 45 for tensioning the bracket 46. The pipe 100 is inserted into the measuring channel 3, then the two housing parts 41, 42 are folded together, i.e. the first housing part 41 is folded over the pipe 100. The bracket 46 is engaged with a projection 47 on the second housing part 42 and the two housing parts 41, 42 are tensioned together by actuating the strap 45. The housing 4 is then in its closed state, in which the pipe 100 is clamped in the measuring channel 3 and thus fixed with respect to the housing 4. Depending on the geometry of the cross-section of the measuring channel 3 and the cross-section of the pipe 100, it is possible and desired that the pipe 100 is deformed when the housing 4 is closed, which will be discussed later.

A first insert 51 is disposed in the first housing part 41, which bounds one half of the measuring channel 3 over its entire length. A second insert 52 is disposed in the second housing part 42, which bounds the other half of the measuring channel 3 over its entire length. In the closed state of the housing 4, the facing surfaces of the first insert 51 and the second insert 52 lie on top of each other and then together bound the measuring channel 3 in which the pipe 100 is inserted.

A connection 48 is also disposed on the housing 4 for a connection cable not shown, with which the housing 4 can be connected to a control device (controller) 10 (FIG. 2) not shown in FIG. 1. Of course, such designs are also possible, in which the control device 10 is integrated into the housing 4. The evaluation of the measuring signals can then take place in the housing 4 and the parameter detected by the evaluation can then be output via the connection 48. The connection 48 also serves for the power supply of the ultrasonic measuring device 1.

A marking element 49 can also be disposed on the housing 4, which defines the flow direction in which the fluid is to flow through the ultrasonic measuring device 1. In the embodiment represented in FIG. 1, the marking element 49 is designed as an arrow which is arranged on the strap 45 and points in the flow direction A. The pipe 100 is then inserted into the measuring channel 3 in such a way that the fluid flows through the measuring channel 3 in the direction of the arrow 49.

Figure 2:
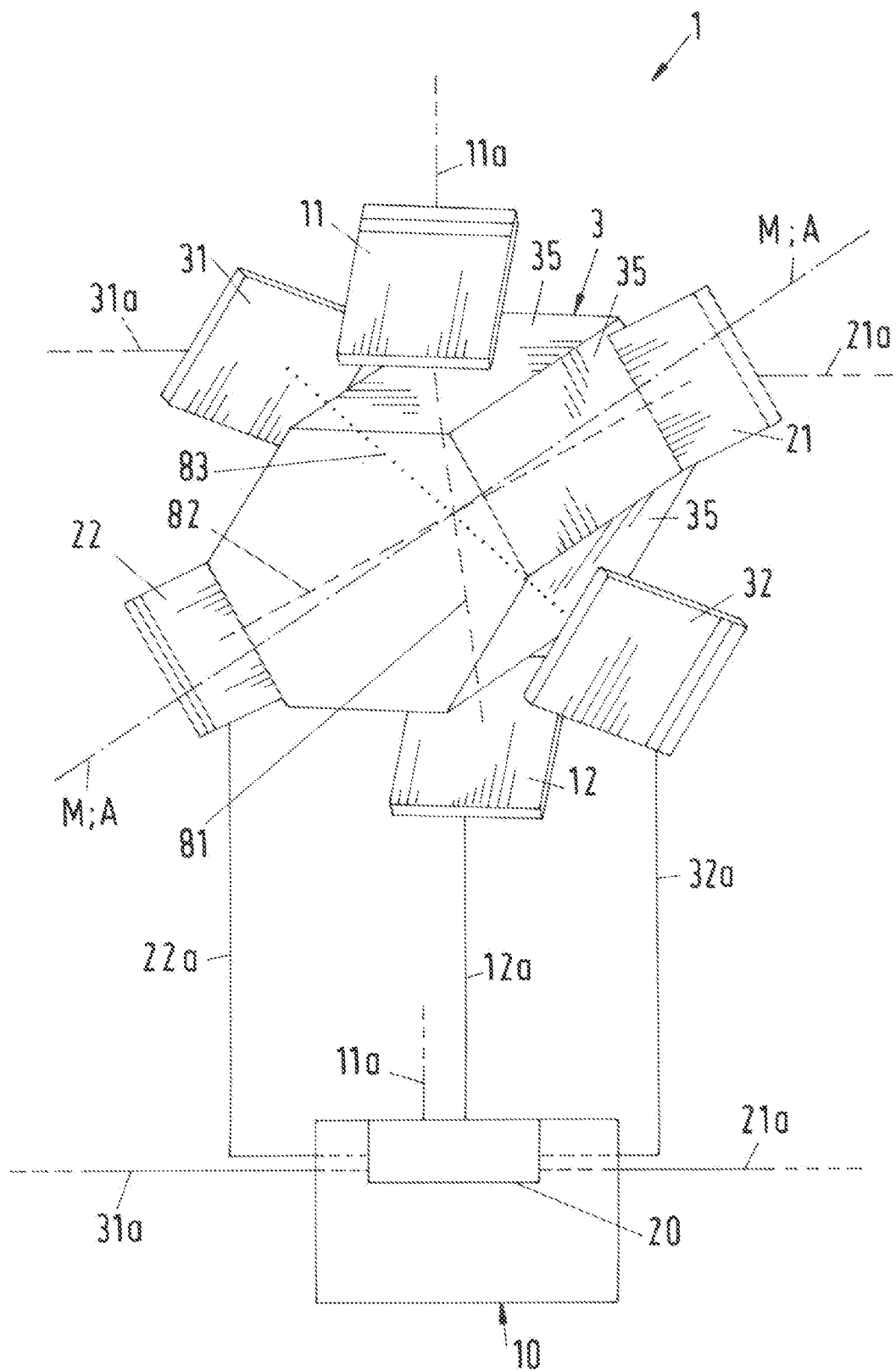
FIG. 2 is a schematic and perspective representation of a first embodiment of an ultrasonic measuring device according to the invention.

FIG. 2 shows in a schematic, perspective representation a first embodiment of an ultrasonic measuring device according to the invention. The housing 4 of the ultrasonic measuring device 1, which is not shown in FIG. 2 for reasons of a better overview, can in particular be designed as explained in FIG. 1. Only the measuring channel 3 or the area bounding it in the circumferential direction is represented in FIG. 2. For a better understanding, FIG. 3 still shows a non-perspective view of the first embodiment in a view in a direction to the center axis M of the measuring channel 3.

In this first embodiment, a total of six ultrasonic transducers 11, 12, 21, 22, 31, 32 are disposed in the housing 4 for the respective emitting and receiving of ultrasonic signals, namely two first ultrasonic transducers 11, 12, two second ultrasonic transducers 21, 22 and two third ultrasonic transducers 31, 32. In the closed state of the housing 4, all ultrasonic transducers 11, 12, 21, 22, 31, 32 are arranged laterally with respect to the measuring channel 3 on or in the first or second insert 51, 52 in the first housing part 41 or in the second housing part 42.

The first ultrasonic transducers 11, 12 form a first pair of transducers and define a first measuring section 81, via which the two first ultrasonic transducers 11, 12 can exchange ultrasonic signals with each other.

The second ultrasonic transducers 21, 22 form a second pair of transducers and define a second measuring section 82, via which the two second ultrasonic transducers 21, 22 can exchange ultrasonic signals with each other.

The third ultrasonic transducers 31, 32 form a third pair of transducers and define a third measuring section 83, via which the two third ultrasonic transducers 31, 32 can exchange ultrasonic signals with each other.

Figure 3:
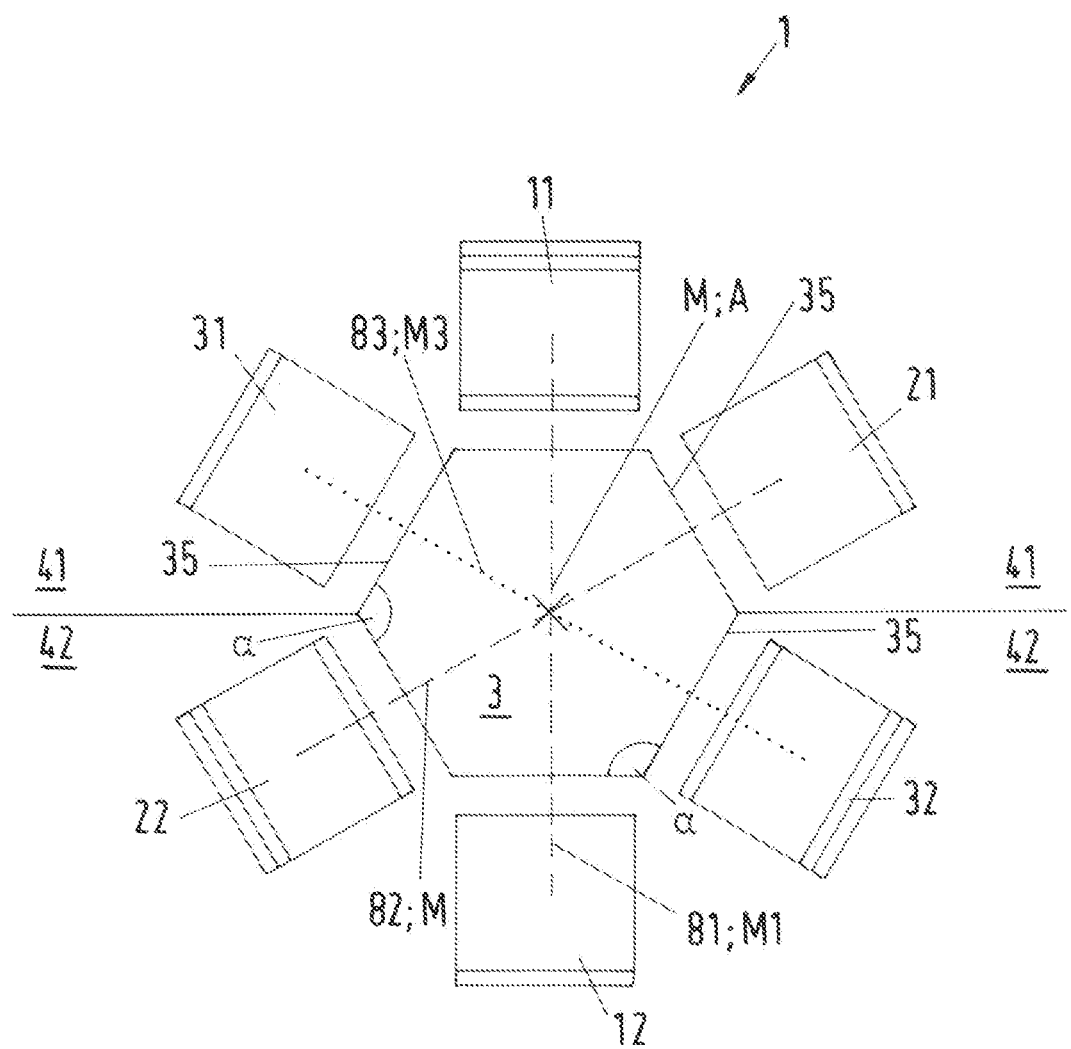
FIG. 3 is a further representation of the first embodiment to clarify the measuring planes.

For a better overview, the first measuring section 81 and the second measuring section 82 are each shown in dashed lines in FIG. 2 and FIG. 3, the third measuring section 83 is shown in dotted lines, and the center axis M of the measuring channel 3 is shown in dot-dashed lines in FIG. 2.

For each pair of transducers, the measuring section 81 or 82 or 83 defined by the pair of transducers is that section along which an ultrasonic signal travels to pass from the one ultrasonic transducer which has emitted this ultrasonic signal, for example 11 or 21 or 31, to the other ultrasonic transducer 12 or 22 or 32 of the same pair of transducers which receives this ultrasonic signal. Usually, for a given ultrasonic transducer 11 or 12 or 21 or 22 or 31 or 32, the associated measuring section 81 or 82 or 83 is defined by a direction vector which is the surface normal at the center of the emitting and receiving surface of this ultrasonic transducer 11, 12, 21, 22, 31, 32. This direction vector extends in the same direction as the sound vector of the ultrasonic transducer 11, 12, 21, 22, 31, 32, which points in the main propagation direction of the ultrasonic signal emitted by the ultrasonic transducer 11, 12, 21, 22, 31, 32.

One of the ultrasonic transducers 11 and 21 and 31 of each pair of transducers is in each case arranged in the first housing part 41, and the other ultrasonic transducer 12 or 22 or 32 is arranged in the second housing part 42. This means that each pair of transducers is arranged such that the measuring channel 3 or the center axis M of the measuring channel 3 is in each case located between the two first ultrasonic transducers 11, 12 and between the two second ultrasonic transducers 21, 22 and between the two third ultrasonic transducers 31, 32.

In this arrangement, in which the two ultrasonic transducers 11, 21 or 21, 22 or 31, 32, which together form a pair of transducers, are arranged on different sides of the measuring channel 3, i.e. if the center axis M of the measuring channel 3 is arranged between these two ultrasonic transducers, then the respective associated measuring section 81, 82, 83 is the connecting line between the centers of the emitting and receiving surfaces of the two ultrasonic transducers, each forming a pair of transducers.

Furthermore, the ultrasonic transducers 11, 12, 21, 22, 31, 32 are arranged and aligned such that both the first measuring section 81 and the second measuring section 82 and the third measuring section 83 each extend obliquely to the flow direction A, i.e. at an angle that is neither zero degrees nor 90°. The two first ultrasonic transducers 11 and 12 are arranged offset with respect to the center axis M of the measuring channel 3, i.e., when viewed in the flow direction A. The same applies analogously to the two second ultrasonic transducers 21, 22 and to the two third ultrasonic transducers 31, 32. Thus, on each measuring section 81, 82, 83, one measurement can in each case be carried out obliquely in the flow direction A and one measurement obliquely against flow direction A.

In the closed state of the housing 4, the measuring channel 3 has a hexagonal cross-section perpendicular to its center axis M, preferably in the form of a regular hexagon. Thus, the measuring channel 3 is bounded by a total of six channel surfaces 35 in the closed state of the housing 4. It is clear that although the hexagonal cross-section is a preferred embodiment, it is to be understood as an example. As explained below, other forms of the cross-section are also suitable for the measuring channel 3.

According to the invention, the ultrasonic transducers of the ultrasonic measuring device 1 are arranged such that in at least two different measuring planes M1, M2, M3 can be measured by ultrasonic signals, which will be explained in more detail in the following using the first embodiment.

In the first embodiment, a total of three measuring planes M1, M2 and M3 are provided. Each measuring plane M1, M2, M3 is in each case defined by the center axis M of measuring channel 3 and one of the measuring sections 81, 82, 83.

The first measuring plane M1 is defined by the center axis M of the measuring channel 3 and the first measuring section 81, i.e. the first measuring plane M1 is spanned by the center axis M and the direction vector of the first measuring section 81. The second measuring plane M2 is defined by the center axis M of the measuring channel 3 and the second measuring section 82, i.e. the second measuring plane M2 is spanned by the center axis M and the direction vector of the second measuring section 82. The third measuring plane M3 is defined by the center axis M of the measuring channel 3 and the third measuring section 83, i.e. the third measuring plane M3 is spanned by the center axis M and the direction vector of the third measuring section 83.

The center axis M of the measuring channel 3 is thus located in each of the measuring planes M1, M2, M3 and thus forms the intersection line of all measuring planes M1, M2, M3.

By arranging the ultrasonic transducers 11, 12, 21, 22, 31, 32 in at least two—here three—different measuring planes M1, M2, M3, a particularly good, homogeneous and at least approximately complete application of ultrasonic signals to the entire measuring volume in the measuring channel 3 can be achieved, which significantly increases the accuracy, reliability and reproducibility of the measurement.

As can be clearly seen in FIG. 2 and FIG. 3, in the first embodiment all three measuring planes M1, M2, M3 are different from each other, which is particularly advantageous with regard to a complete application of ultrasound to the measuring volume. However, there are also embodiments possible for which only two measuring planes are provided, for example, embodiments with only four ultrasonic transducers (see e.g. FIG. 7) or embodiments for which more than two ultrasonic transducers are provided for one measuring plane.

In the first embodiment, in which the measuring channel 3 has a hexagonal cross-section perpendicular to its center axis M and is bounded by six channel surfaces 35, the six ultrasonic transducers 11, 12, 21, 22, 31, 32 are arranged and aligned such that each ultrasonic transducer 11, 12, 21, 22, 31, 32 can apply ultrasonic signals to a different channel surface 35. As can be seen particularly clearly in FIG. 3, the six ultrasonic transducers 11, 12, 21, 22, 31, 32 are arranged around the measuring channel 3 with respect to the circumferential direction, so that each of the six planar channel surfaces can be applied with ultrasonic signals by exactly one of the six ultrasonic transducers 11, 12, 21, 22, 31, 32, 35.

The hexagonal cross-section in particular also has the advantage that the pipe 100 can be particularly easily inserted into the measuring channel 3 in the open state of the housing 4, because the respective channel surfaces 35 open into the surfaces of the inserts 51, 52 at an obtuse angle and not at right angles (see also FIG. 1). Even the angle α, at which adjacent channel surfaces 35 abut against each other, is in each case an obtuse angle, i.e. larger than 90°.

Each of the ultrasonic transducers 11, 12, 21, 22, 31, 32 is signal-connected via a signal line 11a, 12a, 21a, 22a, 31a or 32a with the control device 10 in each case. Via the respective signal lines 11a, 12a, 21a, 22a, 31a or 32a, the control device 10 actuates the ultrasonic transducers 11, 12, 21, 22, 31, 32 for emitting ultrasonic signals and receives the signals received from the ultrasonic transducers 11, 12, 21, 22, 31, 32. The measuring signals received by the ultrasonic transducers 11, 12, 21, 22, 31, 32 are transmitted to an evaluation unit 20, which can be integrated in the control device 10. The received measuring signals are analyzed in the evaluation unit 20 and at least one parameter is detected which is dependent on the sound propagation or the sound velocity or the sound attenuation in the fluid. In particular, the flow velocity of the fluid in the pipe 100 can be detected. As already mentioned, such embodiments are also possible in which the control device 10 is arranged with the evaluation unit 20 in the housing 4 of the ultrasonic measuring device 1.

For reasons of a better overview, the control device 10 with the evaluation unit 20 and the signal lines 11a, 12a, 21a, 22a, 31a, 32a are not shown again in FIG. 3.

Figure 8:
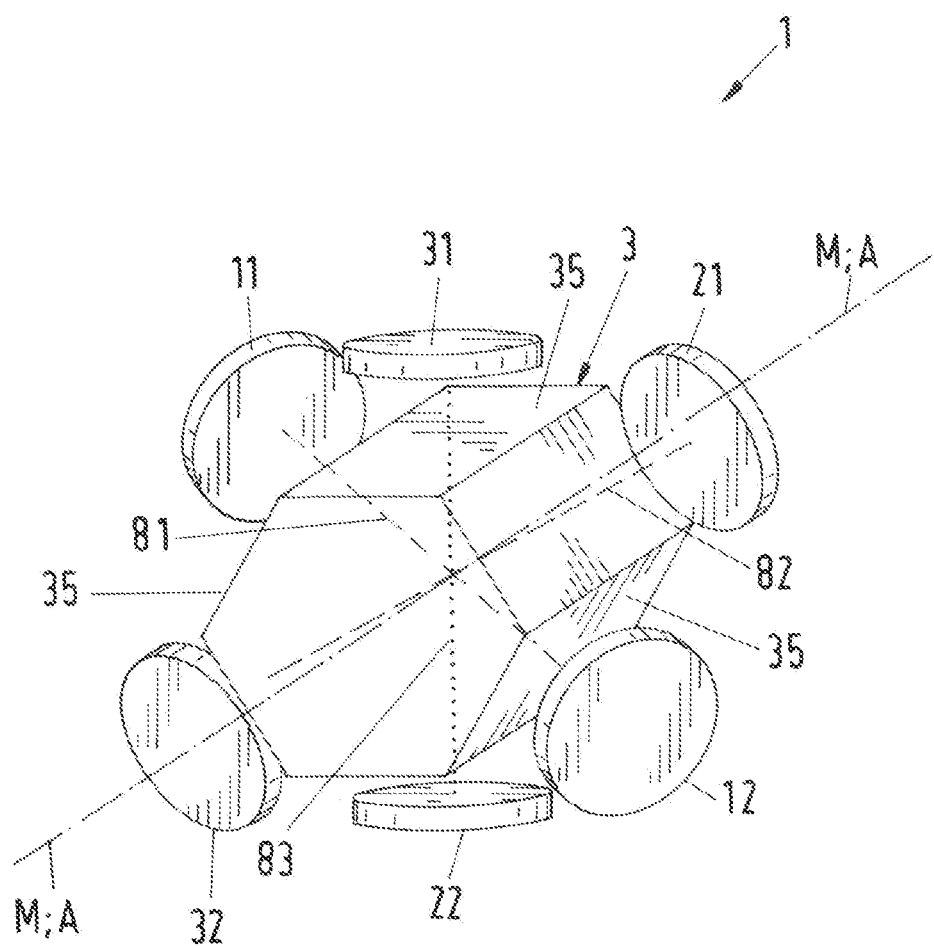
FIG. 8 is a schematic representation of a third embodiment of an ultrasonic measuring device according to the invention in a representation analogous to FIG. 2.

The ultrasonic transducers 11, 12, 21, 22, 31, 32 can be designed in any way known per se, in particular as piezo-electric transducers. The frequency of the ultrasonic signals is typically in the range from 100 kHz to 20 MHz or even up to 30 MHz. The ultrasonic transducers 11, 12, 21, 22, 31, 32 can, for example, as shown in FIG. 2 and FIG. 3, be designed with a rectangular or square emitting and receiving surface or, as shown in FIG. 8, for example, with a round emitting and receiving surface. The ultrasonic transducers 11, 12, 21, 22, 31, 32 can be designed in particular as ceramic elements. However, it is also possible to design the ultrasonic transducers 11, 12, 21, 22, 31, 32 with film-like emitting and receiving surfaces. If the emitting and receiving surface is designed as film, polymers having a strong piezo-electric effect, such as PVDF (polyvinylidene difluoride), are particularly suitable.

If the two ultrasonic transducers 11, 12 or 21, 22 or 31, 32, each forming a pair of transducers, are arranged on different channel surfaces 35, they are preferably each arranged and aligned such that their emitting and receiving surfaces, which are typically formed by a piezoelectric crystal, are parallel to each another.

As already mentioned, all three measuring sections 81, 82, 83 extend in each case obliquely to the flow direction A, so that the main propagation direction of all ultrasonic signals on each of the three measuring sections 81, 82, 83 has a component in the flow direction A different from zero and a component perpendicular to the flow direction A different from zero.

To determine the flow rate of the fluid through the pipe 100, for example, the procedure is as follows. After the pipe 100 is inserted into the housing 4 and the housing 4 is closed, the fluid flows through the ultrasonic measuring device 1.

The one of the first ultrasonic transducers 12 emits an ultrasonic signal along the first measuring section 81 obliquely to and in the flow direction A, which is received by the other first ultrasonic transducer 11. Subsequently, this ultrasonic transducer 11 emits an ultrasonic signal along the first measuring section in reverse direction and thus obliquely and against the flow direction A, which is received by the first ultrasonic transducer 12. The respective received ultrasonic signals are transmitted from the two first ultrasonic transducers 11 or 12 via the respective signal lines 11*a* or 12*a* as measuring signals to the evaluation unit 20. An analogously identical signal exchange takes place between the two second ultrasonic transducers 21, 22 and between the two third ultrasonic transducers 31, 32. The respective received ultrasonic signals are transmitted from the two second and third ultrasonic transducers 21, 22, 31, 32 via the respective signal lines 21*a*, 22*a*, 31*a*, 32*a* as measuring signals to the evaluation unit 20.

The evaluation unit 20 thus receives a total of six received measuring signals, three of which have passed through the flowing fluid obliquely and in the flow direction A, and three of which have passed through the flowing fluid obliquely and against the flow direction A.

In the evaluation unit 20, the transit time differences between those measuring signals that were accelerated by the flowing fluid and those measuring signals that were slowed down by the flowing fluid are detected. This transit time difference between the measuring signals in the flow direction A and the measuring signals against the flow direction A is directly dependent on the flow velocity of the fluid in the pipe 100. Thus, the flow velocity and thus the flow rate of the fluid through the pipe 100 can be detected from the transit time difference.

A particular advantage is that three independent measurements are carried out both in the flow direction A and against the flow direction A in each case, which significantly increases the accuracy and reliability of the determination of the flow rate. Since the ultrasonic transducers 11, 12, 21, 22, 31, 32 are also arranged around the measuring channel 3 and measure in three different measuring planes M1, M2, M3, the measuring volume in the measuring channel 3 is completely applied with ultrasonic signals. This further increases the reliability and reproducibility of the measurement. In particular, the influence of inhomogeneities of the flow in the measuring channel 3 is drastically reduced.

Figure 4:
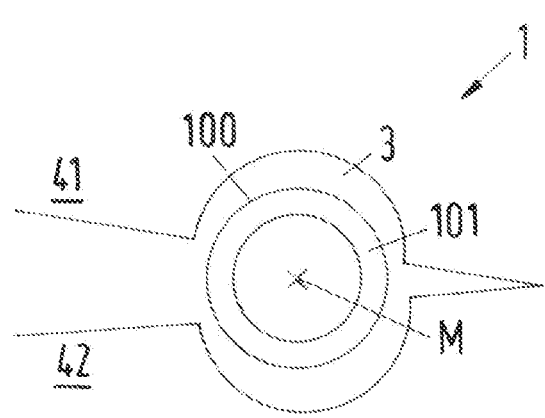
FIG. 4-FIG. 5 are different variants for the design of the measuring channel, each in a schematic representation.
Figure 5:
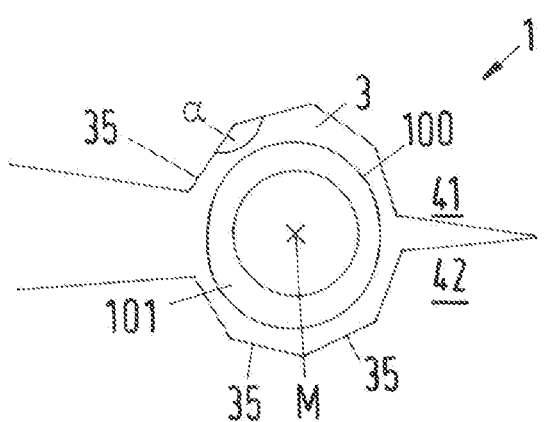

In FIG. 4 and FIG. 5 two variants for the design of the measuring channel 3 are shown in a schematic representation. As it is sufficient for understanding, the ultrasonic transducers are not shown in these figures. In each of FIG. 4 and FIG. 5, the housing 4 is shown in an intermediate state in which it is neither completely open nor completely closed.

In the variant shown in FIG. 4, the measuring channel 3 is designed in such a way that it has a round, or more precisely a circular cross-section perpendicular to its center axis M in the closed state of the housing 4. This can be regarded as the boundary case of an n-cornered cross-section if the number n is chosen very large. The pipe 100 with the wall 101 is also represented in FIG. 4. The pipe 100, which is inserted between the first housing part 41 and the second housing part 42 has also a circular cross-section. It is understood that the diameter of the measuring channel 3 and the outer diameter of the pipe 100 are matched to each other in such a way that the pipe 100 is clamped in the closed housing 4 and is therefore securely fixed in the measuring channel 3 with respect to the housing 4. The ultrasonic transducers not shown are arranged around the measuring channel 3 in the analogously identical way as described above.

In the variant represented in FIG. 5, the measuring channel 3 has a hexagonal cross-section perpendicular to its center axis M in the closed state of the housing 4, i.e. the measuring channel 3 is bounded by a total of eight channel surfaces 35. In this design, it is not necessary, but quite possible, that an ultrasonic transducer is disposed at each of the eight channel surfaces 35. In the variant according to FIG. 5, designs with four ultrasonic transducers are possible, namely with the two first ultrasonic transducers 11, 12 and the two second ultrasonic transducers 21, 22, as well as designs with a total of six ultrasonic transducers, in which the two third ultrasonic transducers 31, 32 are additionally provided. It is understood that designs with more than six ultrasonic transducers are also possible.

With respect to the measuring channel 3, such designs are preferred in which the measuring channel 3 has an n-cornered cross-section perpendicular to its center axis M in the closed state of the housing 4 and is bounded by n channel surfaces 35, where n is a natural number which is greater than or equal to four. Each of the channel surfaces 35 is preferably designed planar, i.e. not curved.

Due to the n-cornered cross-section of the measuring channel 3, the pipe 100 inserted into the measuring channel 3 rests as fully as possible on the channel surfaces 35 after closing the housing 4. In doing so, empty spaces filled with air between the pipe 100 and the channel surfaces 35 can be minimized or even completely avoided. Since air is a very poor ultrasonic conductor, the measuring accuracy can be increased by avoiding such air volumes. In addition, the planar, i.e. non-curved, channel surfaces 35 allow a simpler or better feed of the ultrasonic signals into the measuring channel 3, because the ultrasonic waves then essentially only encounter planar, but not curved surfaces or boundary surfaces.

For n larger than four, the advantage already described for the hexagonal design also results from the fact that the pipe 100 can be inserted particularly easily into the measuring channel 3 in the open state of the housing 4, because the respective channel surfaces 35 open into the surfaces of the inserts 51, 52 at an obtuse angle and not at right angles. In particular, the angle α (FIG. 5) at which adjacent channel surfaces 35 abut against each other is greater than 90° in each case.

The angle α, at which adjacent channel surfaces 35 abut against each other, does not have to be the same for all channel surfaces 35, i.e. the n-cornered cross-section of the measuring channel 3 does not have to be in the form of a regular n-corner, even if the shape of a regular n-corner is preferred as cross-section.

It is also not necessary that in the n-cornered design of the cross-section of the measuring channel 3, the number n is an even number. There are also embodiments possible in which the measuring channel 3, for example, has a pentagonal or a heptagonal cross section perpendicular to its center axis M.

The total number of ultrasonic transducers 11, 12, 21, 22, 31, 32 can be the same as the number n of channel surfaces 35, but it is in particular also possible that the total number of ultrasonic transducers is smaller than the number n of the channel surfaces 35.

There are also embodiments possible in which the total number of ultrasonic transducers 11, 12, 21, 22, 31 is greater than the number n of the channel areas 35. For example, it is possible to provide two ultrasonic transducers which belong to different pairs of transducers on a channel surface 35, wherein these two ultrasonic transducers are preferably arranged in different orientations to the channel surface 35, so that these two ultrasonic transducers can apply ultrasonic signals to the channel surface 35 at different angles.

In such embodiments, in which the two ultrasonic transducers 11, 12 or 21, 22 or 31, 32, which each form a pair of transducers, are arranged on different sides of the measuring channel 3, i.e. in such a way that the center axis M of the measuring channel 3 is located between these two ultrasonic transducers, it is preferred that the ultrasonic transducers are arranged and aligned in such a way that each ultrasonic transducer 11, 12, 21, 22, 31, 32 can in each case apply ultrasonic signals to a different channel surface 35. This means that preferably not more than one ultrasonic sensor is disposed on any of the channel surfaces 35.

It is understood that when the pipe is inserted and/or the housing 4 is closed, the pipe 100 is deformed in such a way that its cross-section corresponds to that of the measuring channel 3.

Figure 6:
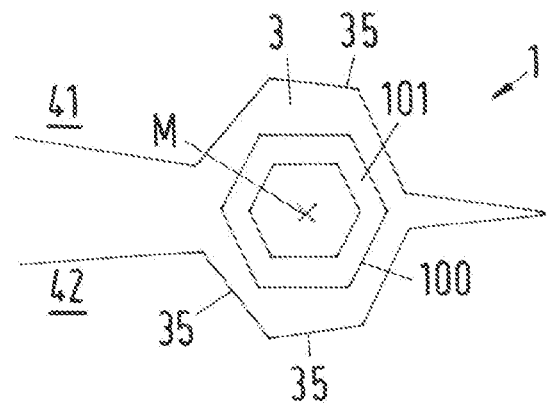
FIG. 6 is a variant for the design of the pipe in a schematic representation.

FIG. 6 shows in an analogous representation to FIG. 4 and FIG. 5 a variant in which the pipe 100, which is inserted into the measuring channel 3, has an n-cornered cross-section, here a hexagonal cross-section. It is therefore also possible to use a pipe 100 whose cross-section (profile) is not round but n-cornered. It is preferred if the number of corners of the cross-section of the pipe 100 corresponds to the number n of corners of the cross-section of the measuring channel 3. In the variant shown in FIG. 6, the measuring channel 3 is designed with a hexagonal cross section perpendicular to its center axis M. A pipe 100 designed with an n-cornered profile has the advantage that even less force is required to insert the pipe 100 into the measuring channel 3 and to close the housing 4.

It is understood that, depending on the design of the measuring channel 3, a device or means can be arranged between the ultrasonic transducers 11, 12, 21, 22, 31, 32 and the measuring channel 3 with which the wave front of the respective ultrasonic signal can be influenced, for example acoustic lenses.

Figure 7:
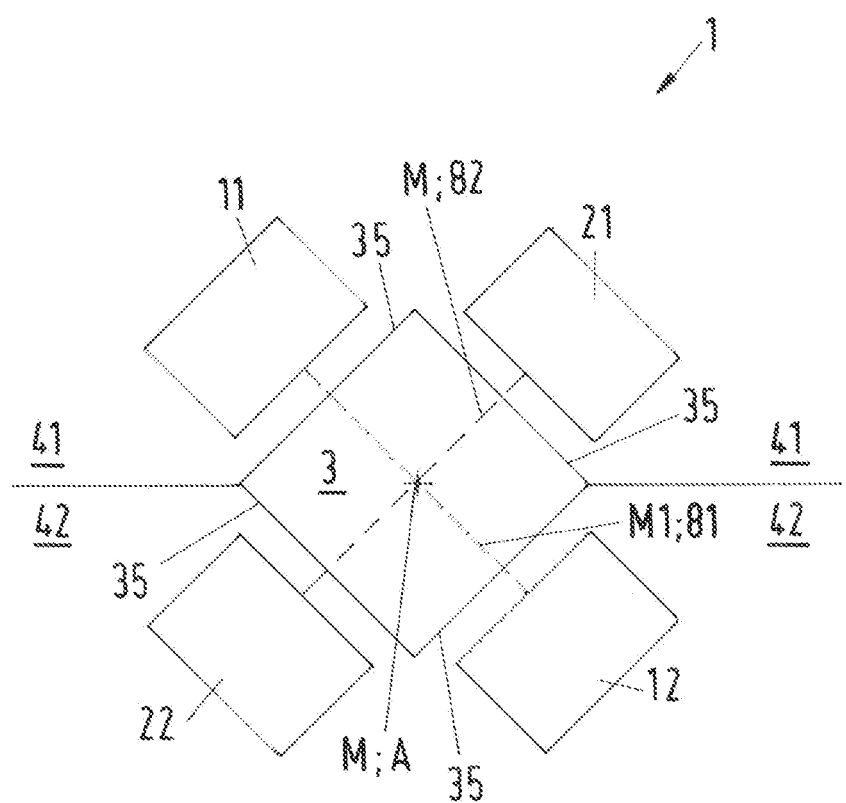
FIG. 7 is a schematic representation of a second embodiment of an ultrasonic measuring device according to the invention in a representation analogous to FIG. 3.

FIG. 7 illustrates in a schematic representation and analogous to FIG. 3, a second embodiment of an ultrasonic measuring device 1 according to the invention. In the following description of the second embodiment, only the differences from the first embodiment will be looked at in more detail. Otherwise, the explanations of the first embodiment or its variants apply in the same manner or analogously the same manner to the second embodiment. In the second embodiment, the same parts or parts with the same function are designated with the same reference signs as in the first embodiment or its variants.

In the second embodiment, a total of four ultrasonic transducers 11, 12, 21, 22 are provided, namely the two first ultrasonic transducers 11, 12 forming the first pair of transducers, with which measurements are taken in the first measuring plane M1, and the two second ultrasonic transducers 21, 22 forming the second pair of transducers, with which measurements are taken in the second measuring plane M2. By the first pair of transducers 11, 12, the first measuring direction 81 is defined, which together with the center axis M of the measuring channel 3 defines the first measuring plane M1. By the second pair of transducers 21, 22, the second measuring direction 82 is defined, which together with the center axis M of the measuring channel 3 defines the second measuring plane M2.

In the second embodiment, the measuring channel 3 is designed in such a way that, in the closed state of the housing 4, it has a square and preferably a quadratic cross-section perpendicular to its center axis M and is bounded by four planar channel surfaces 35 in each case. The measuring channel 3 is designed such that it has in each case a V-shaped cross-section both in the first housing part 41 and in the second housing part 42. This means that the boundary surface between the first housing part 41 and the second housing part 42 extends along a surface diagonal of the square cross-section of the measuring channel 3.

Due to this measure a particularly simple insertion of the pipe 100 into the measuring channel 3 in the open state of the housing 4 can be guaranteed even with a square cross-section of the measuring channel 3 perpendicular to its center axis M, as the respective channel surfaces 35 open into the surfaces of the inserts 51, 52 at an obtuse angle and not at right angles (not shown in FIG. 7). In the open state of the housing 4, the pipe 100 can thus be inserted very easily into a V-shaped cross-section.

The four ultrasonic transducers 11, 12, 21, 22 are again arranged around the measuring channel 3. The two first ultrasonic transducers 11, 12 are arranged offset with respect to the center axis M of the measuring channel 3, i.e. when viewed in the flow direction A. The two second ultrasonic transducers 21, 22 are also arranged offset with respect to the center axis M of the measuring channel 3, i.e. when viewed in the flow direction A.

The four ultrasonic transducers 11, 12, 21, 22 are arranged and aligned with respect to the circumferential direction of the measuring channel 3 in such a way that each ultrasonic transducer 11, 12, 21, 22 applies ultrasonic signals to a different one of the four channel surfaces 35 in each case. The two first ultrasonic transducers 11, 12 are arranged on parallel channel surfaces 35, and the two second ultrasonic transducers 21, 22 are arranged on parallel channel surfaces 35 in each case. Thus, one of the ultrasonic transducers 11, 12, 21, 22 is disposed on each of the four channel surfaces 35 in each case.

FIG. 8 shows in a schematic, perspective and to FIG. 2 analogous representation a third embodiment of an ultrasonic measuring device 1 according to the invention. However, for reasons of a better overview, the control device 10 with the evaluation unit 20 and the signal lines 11*a*, 12*a*, 21*a*, 22*a*, 31*a*, 32*a* are not shown in FIG. 8.

In the following description of the third embodiment, only the differences from the first and second embodiment will be looked at in more detail. Otherwise, the explanations of the first and second embodiment or their variants also apply in the same manner or analogously the same manner to the third embodiment. In the third embodiment, the same parts or parts with the same function are designated with the same reference signs as in the first and second embodiment or its variants.

As in the first embodiment, a total of six ultrasonic sensors 11, 12, 21, 22, 31, 32 are disposed in the third embodiment, namely the two first ultrasonic sensors 11, 12 forming the first pair of transducers, the two second ultrasonic sensors 21, 22 forming the second pair of transducers and the two third ultrasonic sensors 31, 32 forming the third pair of transducers. Furthermore, in the third embodiment, the measuring channel 3 is again designed in such a way that it has a hexagonal cross-section perpendicular to its center axis M in the closed state of the housing.

In contrast to the first embodiment, in the third embodiment the two third ultrasonic transducers 31, 32 are arranged and aligned in such a way that the third measuring section 83 defined by them extends perpendicular to the center axis M of the measuring channel 3 and thus perpendicular to the flow direction A. The two third ultrasonic transducers 31, 32 are aligned such that the surface normal of their respective emitting and receiving surface is perpendicular to the center axis M of the measuring channel 3.

Since in this arrangement the third measuring section 83 passes through the fluid perpendicular to flow direction A, the ultrasonic signals emitted or received over the third measuring section 83 are independent of the flow velocity at which the fluid flows through the pipe 100 with respect to their respective transit times through the fluid and their respective attenuations by the fluid. Therefore, the sound propagation characteristics in the fluid can be detected by these ultrasonic signals, which are emitted and received over the third measuring section 83, independent of the flow velocity of the fluid in the pipe 100.

Thus, with the help of the third measuring section 83, at least one parameter of the fluid can be detected, which depends on the speed of sound or the sound attenuation in the fluid. Such parameters are, for example, the viscosity of the fluid, the occurrence of air or gas bubbles, the concentration of components in the fluid, for example the methanol concentration, or the solids content in a suspension, or the cell density in a biological fluid.

In particular, changes in the fluid, in particular changes in its composition, such as an increase or decrease in the concentration or density of a component or the occurrence of air or gas bubbles can be detected by this third measuring section 83 passing through the fluid perpendicular to its flow direction A. Therefore, the ultrasonic measuring device 1 is also particularly suitable for process monitoring or the monitoring of flowing fluids in flexible and deformable pipes 100, for example in processes in the semiconductor industry, in pharmaceutical or biological processes or for the control of such processes. For example, cell density, protein concentration, salt concentration, nutrient solution concentration, sugar concentration or methanol concentration can be monitored and controlled in one process. If a change in a parameter is detected by the ultrasonic measuring device 1, corrective measures can be initiated by an appropriately designed control loop in order to bring the parameter back to its set point.

If the third ultrasonic transducers 31, 32 are aligned and arranged in such a way that the third measuring section 83 extends perpendicularly to the flow direction A, then, in addition to the flow through pipe 100, a parameter of the fluid independent of the flow velocity of the fluid in the pipe 100 can also be detected. For this purpose, the ultrasonic signals emitted or received over the third measuring section 83 can be analyzed with respect to their transit time, or with respect to their attenuation, or with respect to their transit time and their attenuation.

Figure 9:
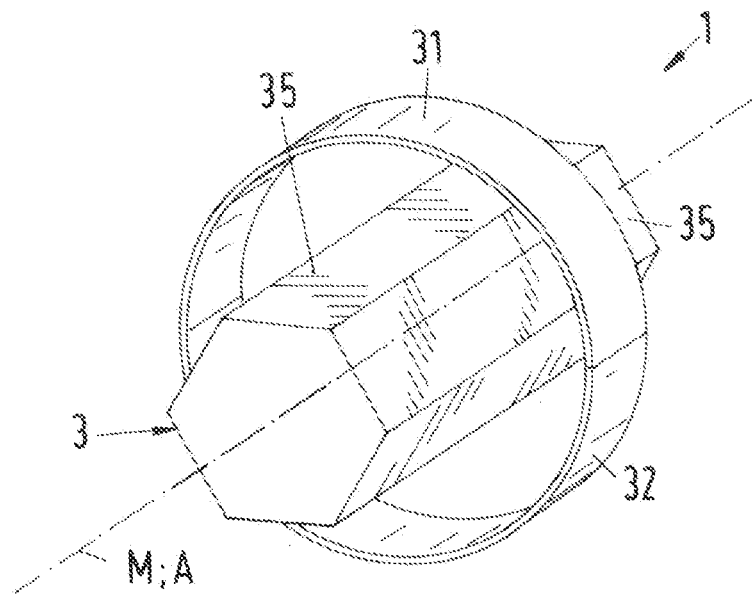
FIG. 9 is a variant for the design of the third pair of transducers.

FIG. 9 shows a variant for the design of the third pair of transducers with the two third ultrasonic transducers 31, 32, which define the third measuring section 83, which is perpendicular to the center axis M of the measuring channel 3 and thus perpendicular to the flow direction A of the fluid.

For reasons of a better overview, the first and the second pair of transducers are not represented. In this variant, the two third ultrasonic transducers 31, 32 are each designed with a curved emitting and receiving surface. Each of the two third ultrasonic transducers 31, 32 has an emitting and receiving surface, which is designed half-ring-shaped, so that the two third ultrasonic transducers 31, 32 complement each other to form a ring which concentrically or coaxially surrounds the measuring channel 3. In this design, the respective curved emitting and receiving surface of the two third ultrasonic transducers 31, 32 are preferably made of a film, for example a PVDF film.

Figure 10:
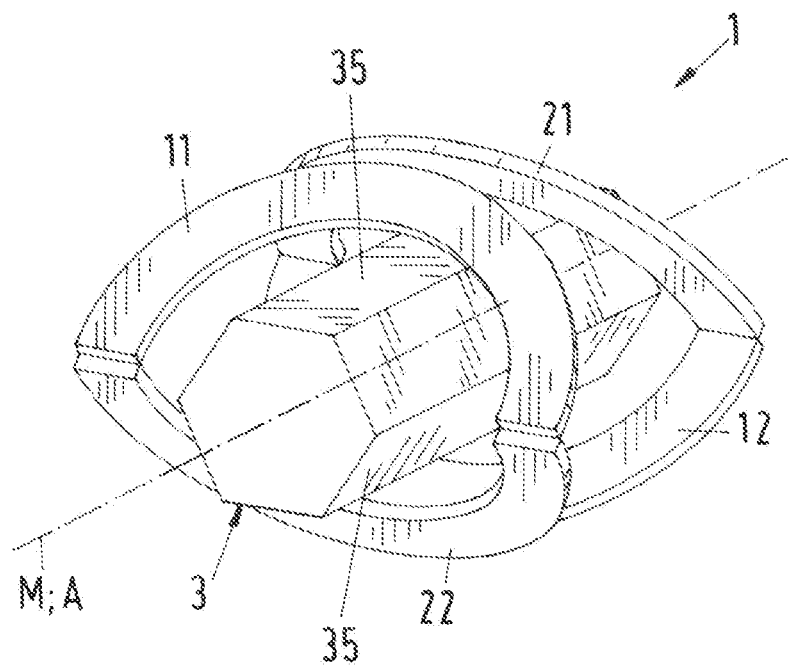
FIG. 10 is a variant for the design of the first and the second pair of transducers.

In FIG. 10, a variant for the design of the first and the second pair of transducers is shown, which can be used for all embodiments and variants described. According to this variant, the two first ultrasonic transducers 11, 12 and the two second ultrasonic transducers 21, 22 are each designed with a curved emitting and receiving surface. Each first ultrasonic transducer 11, 12 and each second ultrasonic transducer 21, 22 is designed in the form of a half ring in each case. Each of these half rings is arranged such that the axis of the respective ring extends obliquely to the center axis M of the measuring channel 3 and thus obliquely to the flow direction A of the fluid. This means that each of the half rings forming one of the first ultrasonic transducers 11, 12 or of the second ultrasonic transducers 21, 22 is inclined against the center axis M of the measuring channel 3 in such a way that the half-ring-shaped emitting and receiving surfaces of the two first ultrasonic transducers 11, 12 are parallel to each another, and that the two half-ring-shaped emitting and receiving surfaces of the second ultrasonic transducers 21, 22 are parallel to each another. One of the two ultrasonic transducers 11, 21 of each pair of transducers in each case is arranged in the first housing part 41 and the other of the two ultrasonic transducers 12, 22 is arranged in the second housing part 42. It is understood that of course a third pair of transducers, such as those shown in FIG. 8 or FIG. 9, can be provided in the variant represented in FIG. 10.

Also, in the variant represented in FIG. 10, the half-ring-shaped emitting and receiving surfaces of the ultrasonic transducers 11, 21, 21, 22 are preferably made of a film, for example a PVDF film.

A further variant is to design the half rings, which form the ultrasonic transducers 11, 12, 21, 22 in FIG. 10, as segments. For example, only one segment of the respective half ring can be designed in each case as an emitting and receiving surface for emitting and receiving ultrasonic signals. However, it is also possible that on each of the half rings several separate emitting and receiving surfaces are provided for the respective emission and reception of ultrasonic signals, whereby each separate emitting and receiving surface is designed as a segment on the respective half ring. Emitting and receiving surfaces can also be provided and arranged in such a way that the ultrasonic signals emitted by them do not apply the measuring channel 3 but pass through the housing 4 next to measuring channel 3. Such signals are suitable, for example, for gauging or for calibrating the ultrasonic measuring device 1.

Figure 11:
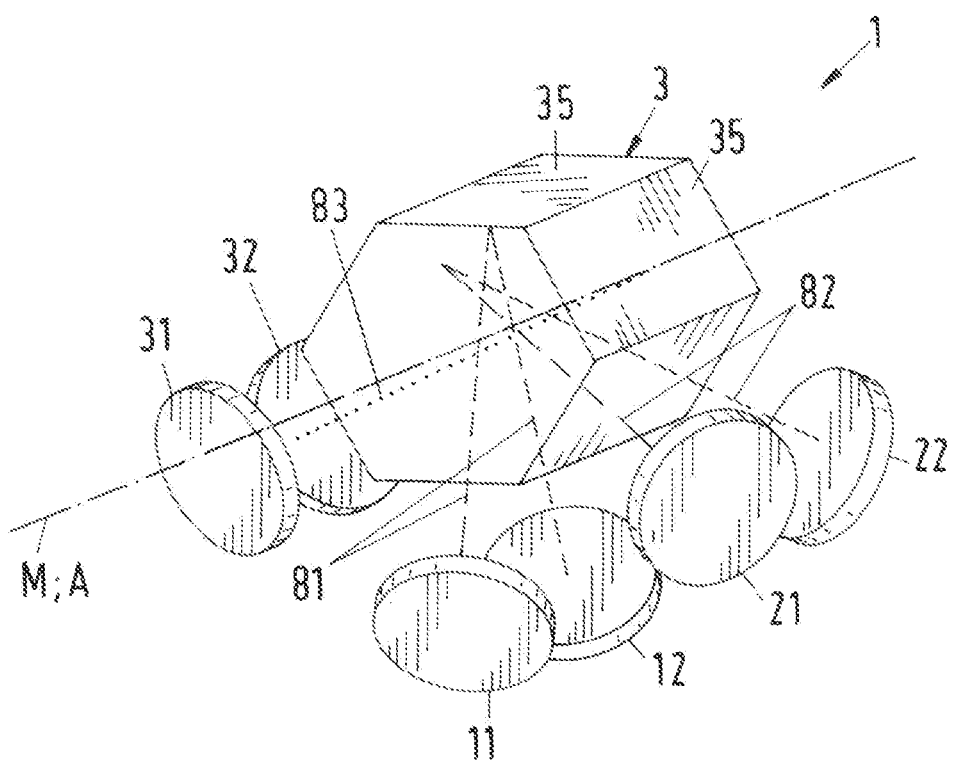
FIG. 11 is a schematic representation of a fourth embodiment of an ultrasonic measuring device according to the invention in a representation analogous to FIG. 2.

FIG. 11 shows in a schematic representation a fourth embodiment of an ultrasonic measuring device 1 according to the invention in a perspective representation analogous to FIG. 2. However, for reasons of a better overview, the control device 10 with the evaluation unit 20 and the signal lines 11a, 12a, 21a, 22a, 31a, 32a are not shown in FIG. 11.

In the following description of the fourth embodiment, only the differences from the other embodiments will be looked at in more detail. Otherwise, the explanations of the first three embodiments or their variants also apply in the same manner or analogously the same manner to the fourth embodiment. In the fourth embodiment, the same parts or parts with the same function are designated with the same reference signs as in the first three embodiments.

As in the first embodiment, a total of six ultrasonic transducers 11, 12, 21, 22, 31, 32 are provided in the fourth embodiment, namely the two first ultrasonic transducers 11, 12 forming the first pair of transducers and defining the first measuring section 81, the two second ultrasonic transducers 21, 22 forming the second pair of transducers and defining the second measuring section 82, and the two third ultrasonic transducers 31, 32 forming the third pair of transducers and defining the third measuring section 83. Furthermore, in the fourth embodiment, the measuring channel 3 is again designed in such a way that it has a hexagonal cross-section perpendicular to its center axis M in the closed state of the housing. The three measuring planes M1, M2, M3 are again defined by the three measuring sections 81, 82, 83 and the center axis M of the measuring channel 3 in the analogous same way as in the other embodiments.

In contrast to the first embodiment, in the fourth embodiment all ultrasonic transducers 11, 12, 21, 22, 31, 32 are arranged in one of the two housing parts 41, 42, here in the lower housing part, which is the second housing part 42 and is not shown in detail in FIG. 11. Of course, such embodiments are also possible in which all ultrasonic transducers are arranged in the first housing part 41.

The two ultrasonic transducers 1, 12 or 21, 22 or 31, 32 each forming a pair of transducers then exchange ultrasonic signals with each other via a reflection. For example, one of the first ultrasonic transducers 11 or 12 emits an ultrasonic signal along the first measuring section 81 obliquely to the flow direction A to one of the channel surfaces 35. The ultrasonic signal passes through the measuring channel 3 obliquely to the flow direction A, for example obliquely in the flow direction A, is reflected at the opposite channel surface 35 and then reaches the other of the two first ultrasonic transducers 12 or 11. This can also emit an ultrasonic signal, which then runs obliquely against the flow direction A, is reflected at the opposite channel surface 35, and is then received by the first mentioned of the two first ultrasonic transducers 11 or 12.

In an analogously same way, the two second ultrasonic transducers 21, 22 of the second pair of transducers and the two third ultrasonic transducers 31, 32 of the third pair of transducers each exchange ultrasonic signals via the corresponding second measuring section 82 or third measuring section 83. As shown in FIG. 11, the six ultrasonic transducers 11, 12, 21, 22, 31, 32 are arranged and aligned such that all three measuring sections 81, 82, 83 extend obliquely, i.e. in particular not at right angles, to the center axis M of the measuring channel 3 and thus to the flow direction A. The two ultrasonic transducers 11, 12 or 21, 22 or 31, 32, which belong to the same pair of transducers, are each arranged on the same channel surface 35. This means, for example, that the two first ultrasonic transducers 11, 12 are arranged such that they can apply ultrasonic signals to the same channel surface 35. The same applies to the two second transducers 21, 22 and to the two third transducers 31, 32. It is preferred—as shown in FIG. 11—that the ultrasonic transducers 11, 12, 21, 22, 31, 33 are arranged and aligned in such a way that each pair of transducers in each case applies ultrasonic signals to a different channel surface 35.

Of course, such variants are also possible in the fourth embodiment, in which the ultrasonic transducers 31, 32 of the third pair of transducers are arranged and aligned such that the third measuring section 83 is perpendicular to the center axis M of the measuring channel 3 and thus perpendicular to the flow direction A. Over this third measuring section 83, a parameter of the fluid can then again be detected which is independent of the flow velocity of the fluid in the pipe 100. It is also possible to measure a pipe parameter over the third measuring section 83, which is perpendicular to the center axis M of channel 3, which refers to a parameter that describes the characteristics of the pipe 100 used in the respective application, for example the thickness of the wall 101 or the material of which the pipe 100 is formed.

The arrangement of the third measuring section 83 perpendicular to the center axis M can, for example, be realized in the analogously same way as explained in connection with FIG. 8 or FIG. 9. It is possible that one of the two third ultrasonic transducers 31 or 32 is arranged in the first housing part 41, and the other of the two third ultrasonic transducers 32 or 31 is arranged in the second housing part 42, so that the center axis M extends between the two third ultrasonic transducers 31 or 32.

According to another variant, it is also possible to provide only a third ultrasonic transducer 31 or 32, which is arranged either in the first housing part 41 or in the second housing part 42. This third ultrasonic transducer 31 or 32 is aligned such that it applies ultrasonic signals to the measuring channel 3 perpendicular to its center axis M, so that the third measuring section 83, which is defined by the third ultrasonic transducer 31 or 32, is perpendicular to the flow direction A of the fluid. In this variant, the ultrasonic measuring device 1 then has only five ultrasonic sensors, namely the two first ultrasonic transducers 11, 12, the two second ultrasonic transducers 21, 22, and only one of the two third ultrasonic transducers 31 or 32.

In this variant, the only third ultrasonic transducer 31 or 32 emits an ultrasonic signal perpendicular to the flow direction A. This signal is then reflected at least partially at the opposite channel surface 35 after passing through the measuring channel 3, and the resulting echo signal is then received by the only third transducer 31 or 32 that has emitted the ultrasonic signal.

Figure 12:
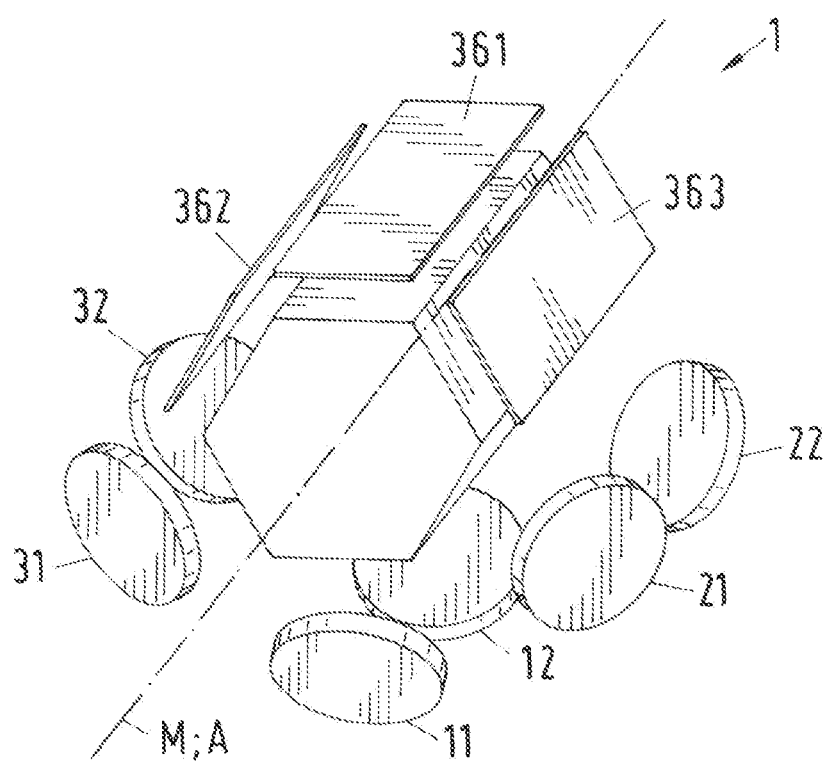
FIG. 12 is a variant of the fourth embodiment.

FIG. 12 shows a variant for the fourth embodiment in a representation analogous to FIG. 11. In this variant, reflectors 361, 362, 363 are disposed at those channel surfaces 35, which are located opposite the channel surfaces 35 applied by the pairs of transducers in order to reflect the ultrasonic signals emitted by the ultrasonic transducers 11, 12, 21, 22, 31, 32. A total of three reflectors 361, 362, 363 are provided, namely a first reflector 361 being arranged opposite the first pair of transducers, a second reflector 362 being arranged opposite the second pair of transducers, and a third reflector 363 being arranged opposite the third pair of transducers. This means that the first reflector 361 is arranged on that channel surface 35, which is located opposite the channel surface 35 applied by the first ultrasonic transducers 11, 12, the second reflector 362 is arranged on that channel surface 35, which is located opposite the channel surface 35 applied by the second ultrasonic transducers 21, 22 and the third reflector 363 is arranged on that channel surface 35, which is located opposite the channel surface 35 applied by the third ultrasonic transducers 31, 32. The reflectors 361, 362, 363 are arranged outside the measuring channel 3. Each reflector 361, 362, 363 is designed as a planar, i.e. non-curved, plate-shaped structure, which is arranged parallel to the respective channel surface 35.

Figure 13:
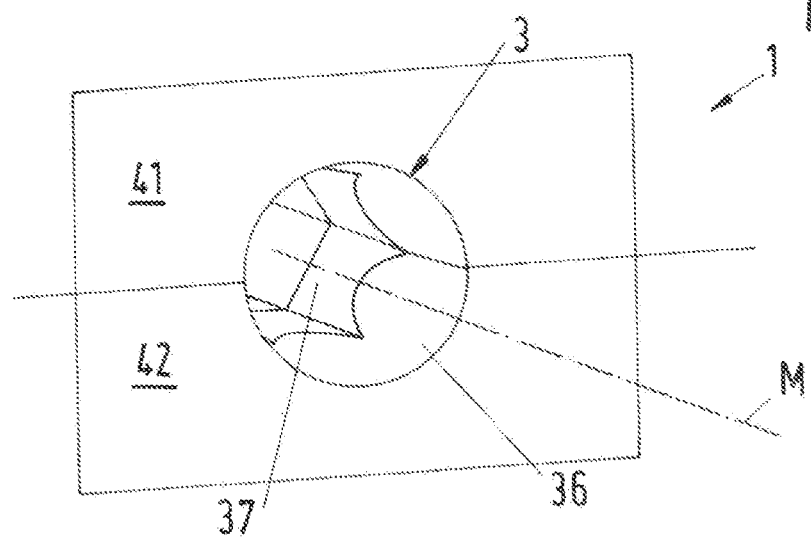
FIG. 13 is a preferred design of the entrance area and the exit area of the measuring channel.

In FIG. 13, a particularly preferred embodiment of the measuring channel 3 is illustrated in a schematic representation, which is preferred for all embodiments and their variants in which the measuring channel 3 has an n-cornered cross-section perpendicular to its center axis M in the closed state of the housing 4. In this embodiment, the measuring channel 3 has the entrance area 36 (see also FIG. 1), the central area 37 and the exit area 38, which are arranged one behind the other when viewed in the flow direction A. The exit area 38 is not to be seen in FIG. 13, but it is designed in the analogously same way as the entrance area 36. The entrance area 36 and the exit area 38 are the two end areas of the measuring channel 3, which are arranged at the two ends of the housing 4 with respect to the flow direction A, and the central area 37 is the area in between which bounds the measuring volume to which the ultrasonic signals are applied. According to the preferred embodiment illustrated in FIG. 13, the entrance area 36 and the exit area 38 each have a circular cross-section perpendicular to the center axis M of the measuring channel 3, and the central area 37 has the n-cornered, here hexagonal cross-section perpendicular to the center axis M in the closed state of the housing. Here, the measuring channel 3 is designed such that the n-cornered cross-section of the central area 37 merges continuously and smoothly into the circular cross-section of both the entrance area 36 and the exit area 38. Due to this continuous, smooth transition from the round profile (e.g. the pipe 100 outside the housing) to the n-cornered profile of the measuring channel 3, abrupt cross-sectional changes are avoided. Thus, all flow vectors in the pipe 100 are led into the measuring channel 3 on orderly paths and out of the measuring channel 3 on orderly paths. Due to this measure, turbulences or other unfavorable flow conditions in the measuring channel 3 can be at least significantly reduced, if not completely avoided.

Figure 14:
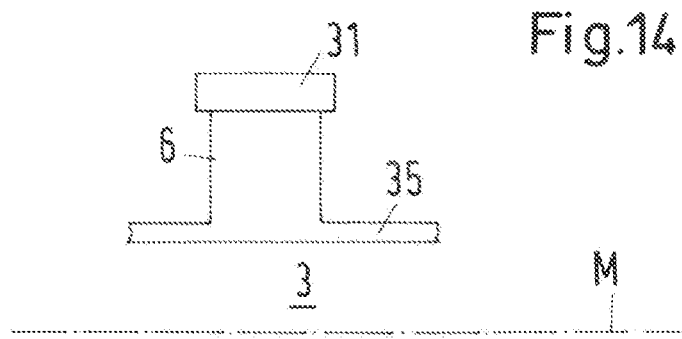
FIG. 14 is a preferred arrangement of the ultrasonic transducers on the measuring channel.

In FIG. 14, a preferred arrangement of the ultrasonic transducers 11, 12, 21, 22, 31, 32 is represented in a schematic representation using the example of the third ultrasonic transducer 31. This arrangement is particularly preferred for all embodiments and their variants in which the ultrasonic sensors 11, 12, 21, 22, 31, 32 have planar emitting and receiving surfaces. As already mentioned, all ultrasonic transducers 11, 12, 21, 22, 31, 32 are preferably arranged inside the housing 4 or in the two inserts 51, 52 which are disposed in the first housing part 41 or in the second housing part 42. As represented in FIG. 14 using the example of the third ultrasonic transducer 31, it is preferred if the ultrasonic transducers 11, 12, 21, 22, 31, 32 are not placed directly on the measuring channel 3 or on the channel surface 35, but on a base 6, so that the respective ultrasonic transducer, here 31, is at a distance from the measuring channel 3. The base 6 has the advantage of preventing the coupling of interfering ultrasonic waves, which are emitted transversely to the desired measuring section 81, 82, 83 or transversely to the main propagation direction. Such interfering ultrasonic waves could travel around the entire housing and interfere, for example, with the measuring signals, thereby falsifying or altering these measuring signals. Such interference signals can be at least reduced by the base 6.

FIG. 14 shows the case where the third ultrasonic transducer 31 is aligned for a third measuring section 83, which is perpendicular to the center axis M of measuring channel 3. Of course, it is understood that the respective ultrasonic transducer is arranged obliquely on the base 6 for measuring sections 81, 82, 83 extending obliquely to the flow direction A.

The measuring sections 81, 82, 83 along which the two ultrasonic transducers of a pair of transducers 11, 12 or 21, 22 or 31, 32 exchange in each case ultrasonic signals with each other are defined by the main propagation direction of the respective ultrasonic transducer 11, 12, 21, 22, 31, 32. In addition to these measuring sections 81, 82, 83, other measuring paths P (FIG. 15) can also be used to receive ultrasonic signals and use them for evaluation. The ultrasonic signal emitted by the respective ultrasonic transducer 11, 12, 21, 22, 31, 32, which represents a pressure wave, not only propagates in the main propagation direction, but there are also signal components which propagate in other directions. Thus, for example, the main maximum of the ultrasonic signal is usually club-shaped, i.e. it does not only propagates exactly perpendicular to the emitting and receiving surface of the ultrasonic transducer 11, 12, 21, 22, 31, 32. In addition, these signal components, which propagate in directions other than the main direction of propagation, can be, for example, minor or lateral maxima (often also referred to as minor or lateral lobes) of the ultrasonic signal emitted by the respective ultrasonic transducer 11, 12, 21, 22, 31, 32. These signal components, which do not propagate along the measuring sections 81, 82, 83, can also be used for the evaluation of the measurement.

Figure 15:
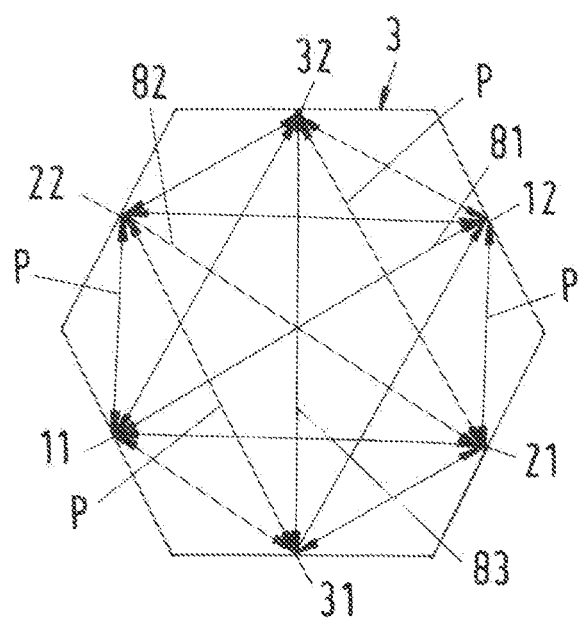
FIG. 15 is an illustration of different measuring paths between the ultrasonic transducers.

These additional measuring paths P are illustrated in FIG. 15 in a schematic representation for an embodiment in which a total of six ultrasonic transducers 11, 12, 21, 22, 31, 32 are provided, which are arranged around the measuring channel 3, which has a hexagonal cross-section perpendicular to its center axis M. The three measuring sections, which are defined by the main propagation directions of the ultrasonic signal emitted by the respective ultrasonic transducer 11, 21, 21, 22, 31, 31, are in turn designated with the reference signs 81, 82, 83. The other connecting lines represent measuring paths P in the sense described above. The total number of measuring sections 81, 82, 83 and measuring paths P for n ultrasonic transducers 11, 21, 21, 22, 31, 32 is given by half the product of n and (n−1), i.e. by 0.5×n×(n−1). In the case that n is equal to six, a total of fifteen measuring sections 81, 82, 83 and measuring paths P result, i.e. three measuring sections 81, 82, 83 and twelve measuring paths P.

With regard to the ultrasonic signals emitted by the respective ultrasonic transducers 11, 12, 21, 22, 31, 32, there are numerous possibilities, some of which are mentioned below with reference to FIG. 16-FIG. 21. For the sake of simplicity and because it is sufficient for comprehension, reference is made to an embodiment in which measurements are made with two measuring sections, namely with the first measuring section 81 and with the second measuring section 82, and with four ultrasonic transducers, namely the two first ultrasonic transducers 11, 12 forming the first pair of transducers, and the two second ultrasonic transducers 21, 22 forming the second pair of transducers. An analogous extension to three or more measuring sections is no problem for the person skilled in the art.

In FIG. 16 to FIG. 21 the time t in each case is plotted on the horizontal axis and the amplitude U of the ultrasonic signal emitted by the ultrasonic transducers 11, 12, 21, 22 on the vertical axis. The ultrasonic transducers 11, 12, 21, 22 are actuated by the control device 10 via the respective signal line 11a, 12a, 21a, 22a in order to emit the respective ultrasonic signal.

Figure 16:
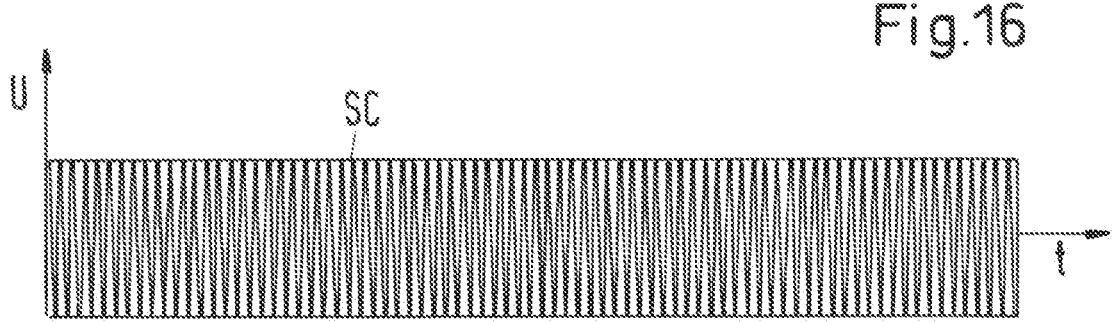
FIG. 16-FIG. 21 are representations of various pulse sequences for generating measuring signals.

With the ultrasonic signal represented in FIG. 16, the respective ultrasonic transducer 11, 12, 21, 22 emits a continuous signal SC (CW: continuous wave). The term "continuous" ultrasonic signal refers to an ultrasonic signal in which the amplitude of the signal is substantially constant over a period of time, which is significantly greater than the settling time or the decay time of the signal, i.e. the transient portion of the signal. The amplitude of the signal is referred to as "substantially" constant over a period of time if the change in the amplitude of the signal during that period is at most 7%, in particular at most 5%, preferably at most 3% and particularly preferably at most 1%.

Figure 17:
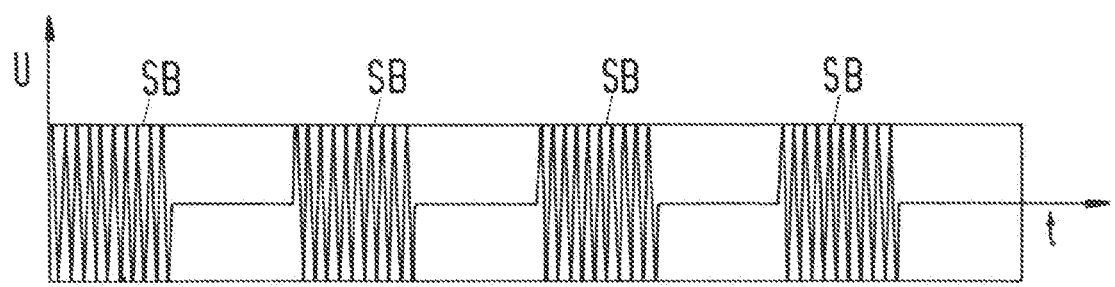

Alternatively, it is also possible that the respective ultrasonic transducer 11, 12, 21, 22 emits a pulse packet SB (burst) for each measurement. Such ultrasonic signals are represented in FIG. 17, wherein each pulse packet SB belongs to one measurement in each case.

Figure 18:
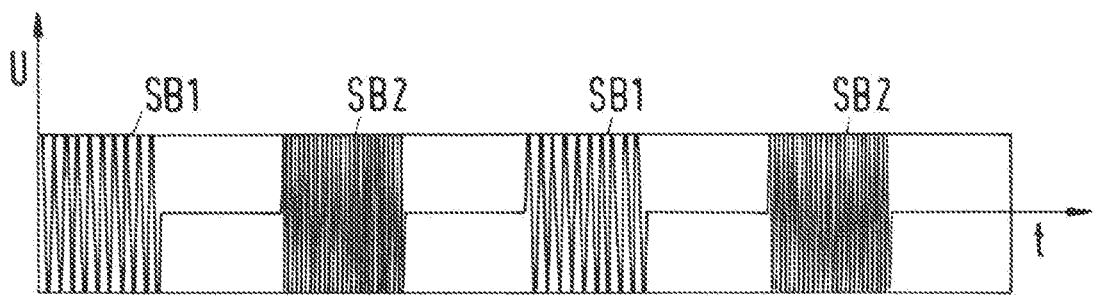

Another possibility is shown in FIG. 18. Here, too, a pulse packet SB1 or SB2 is emitted for each measurement, although different frequencies are used for the two measurement sections 81 and 82. The pulse packet SB1, which is used for the first measuring section 81 has a lower frequency than the pulse packet SB2, which is used for the second measuring section 82.

Figure 19:
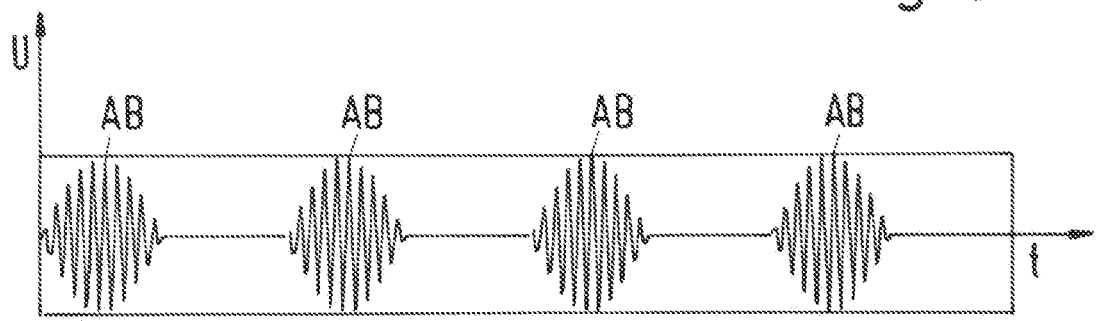

In the variant illustrated in FIG. 19, the respective ultrasonic transducer 11, 12, 21, 22 again emits a pulse packet AB (burst) for each measurement, but the pulse packet AB is amplitude modulated, i.e. the amplitude of the signal in the respective pulse packet AB changes with time t.

Figure 20:
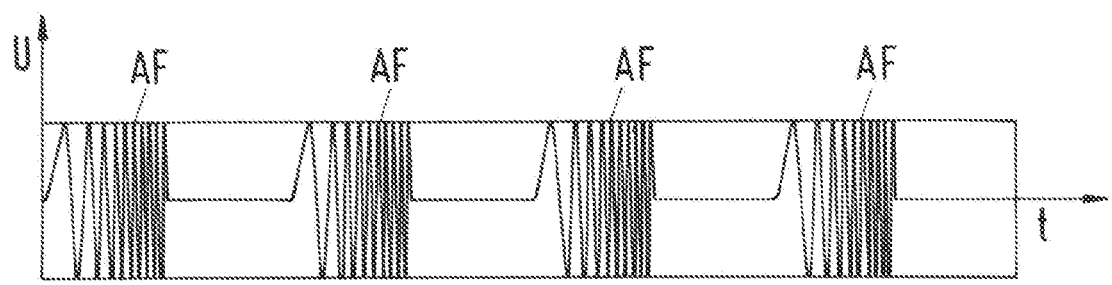

In the variant illustrated in FIG. 20, the respective ultrasonic transducer 11, 12, 21, 22 again emits a pulse packet AB (burst) for each measurement, but the pulse packet is frequency modulated, i.e. the frequency of the signal in the respective pulse packet AF changes with time t. Such a pulse packet AF is also called chirp burst.

Of course, it is also possible to combine frequency modulation and amplitude modulation.

Figure 21:
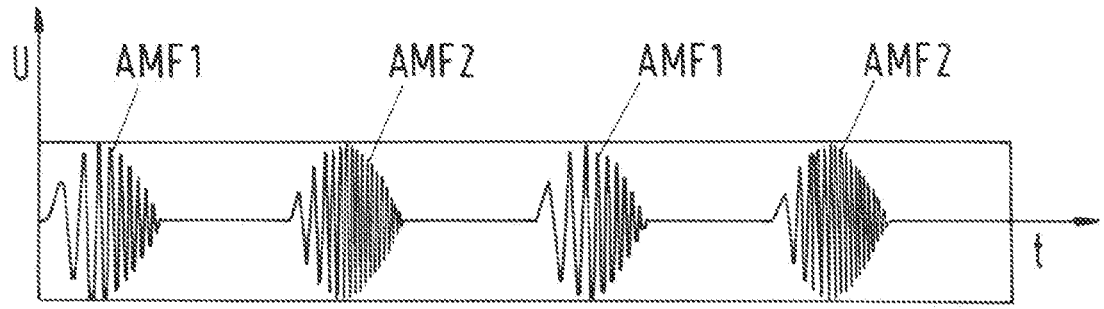

In the variant illustrated in FIG. 21, the respective ultrasonic transducer 11, 12, 21, 22 again emits a pulse packet AMF1, AMF2 for each measurement, but the respective pulse packet is both amplitude modulated and frequency modulated, i.e. both the frequency of the signal and the amplitude in the respective pulse packet AMF1, AMF2 changes with time t. Such a pulse packet AMF1 or AMF2 is also called amplitude modulated chirp burst. Similar to the variant represented in FIG. 18, it is also possible to use different frequencies for the two measuring sections 81, 82 for the variant represented in FIG. 21. It is also possible to use different amplitudes and/or different frequency modulations and/or different amplitude modulations for the two measuring sections 81, 82. In FIG. 21, the ultrasonic signals used for the first measuring section 81 are designated AMF1 and the ultrasonic signals used for the second measuring section 82 are designated AMF2.

It is understood that the ultrasonic measuring device 1 according to embodiments of the invention can also comprise other sensors or measuring devices with which the characteristics of the fluid flowing through the pipe 100 can be detected or determined.

Thus, the ultrasonic measuring device 1 according to embodiments of the invention can comprise, for example, a temperature sensor for determining the temperature of the fluid in the pipe 100. The temperature sensor can, for example, be designed as a contactless sensor with which the temperature of the fluid can be detected without the temperature sensor being in thermal contact with the pipe 100 or the fluid flowing in it. For this purpose, the temperature sensor can be designed as an infrared sensor, for example. Of course, temperature sensors can also be provided, which determine the temperature via a physical contact. In this case, the temperature sensor is preferably arranged such that it is in good thermal contact with the pipe 100 in the closed state of the housing, and particularly preferred such that the temperature sensor is in physical contact with the area of the pipe 100 that is inserted into the measuring channel 3.

In addition, parameters of the fluid can be detected, which are dependent on the speed of sound or the sound attenuation in the fluid, but not on the flow velocity of the fluid in the pipe 100 with those embodiments of the ultrasonic measuring device 1 according to embodiments of the invention, in which at least one measuring section is provided which is perpendicular to the flow direction A of the fluid in the pipe 100.

In particular, such an ultrasonic measuring device 1 is suitable for the measurement on fluids used in pharmaceutical or biotechnological processes, such as cell suspensions, protein-containing fluids or fluids with organic components. They may also be fluids commonly used in the semiconductor industry, for example suspensions of silicon dioxide in water or the like which are called slurry. The ultrasonic measuring device 1 according to embodiments of the invention is also suitable for fluids which are or comprise chemically aggressive or highly aggressive substances, such as alcohols, acids, or alkalis, such as ethanol, isopropanol, acetone, sulphuric acid, hydrochloric acid, nitric acid, or ammonia water. The ultrasonic measuring device 1 is suitable for fluids over the entire pH-value range from 0 to 14 and at least for the temperature range from −40° C. to +95° C. Suitable materials for the ultrasonic measuring device 1 are for example polypropylene (PP) or polyphenylene sulfide (PPS) or coated materials.

The ultrasonic measuring device 1 according to embodiments of the invention is particularly suitable for supervision, monitoring and control of processes, for example in biotechnology, in the pharmaceutical industry or in the semiconductor industry, where a fluid flows through a preferably flexible or deformable pipe 100. Depending on the design, changes in parameters and thus in the characteristics of the fluid, such as changes in concentration or other changes in the composition of the fluid, can also be reliably detected.

Figure 22:
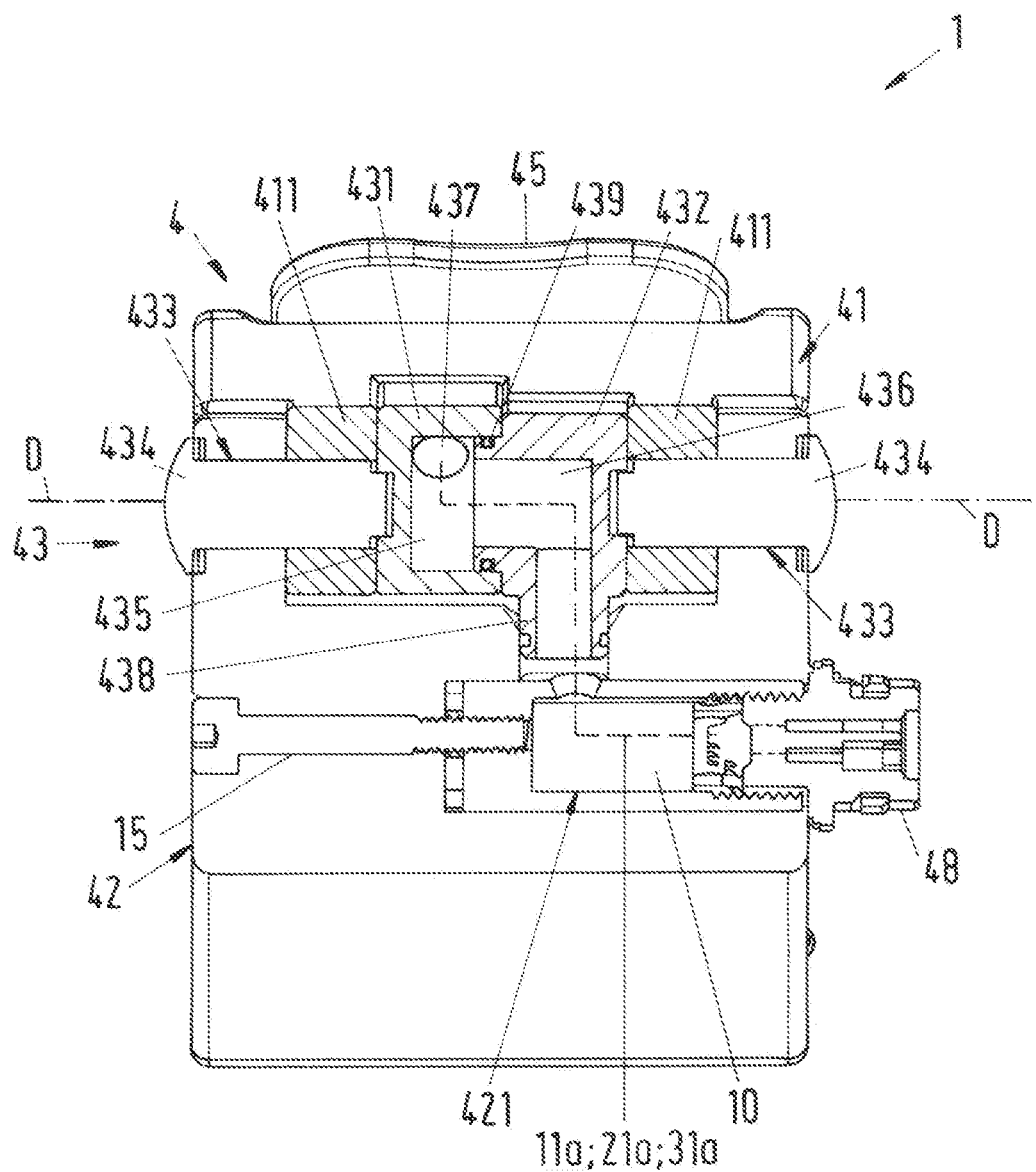
FIG. 22 is an embodiment of the articulated connection of the two housing parts in a section through the axis of rotation of the joint.

With regard to a design that is as compact as possible, it is preferred that the control device 10, with which the ultrasonic transducers 11, 12, 21, 22, 31, 32 are actuated and which receives the measuring signals from the ultrasonic transducers 11, 12, 21, 22, 31, 32, is arranged in the housing 4 of the ultrasonic measuring device 1 or is integrated in the housing 4. Such a design is represented in FIG. 22. The control device 10, which optionally comprises the evaluation unit 20, is arranged in the second housing part 42 and is signal-connected to the connection 48. The connection 48 is screwed into the second housing part 42. The ultrasonic measuring device 1 is supplied with energy via the connection 48. Furthermore, measurement signals and/or other data can be exchanged between the control device 10 and an external interface (not shown) or another external device (not shown) via the connection 48.

A further aspect of the invention, which relates in particular to those embodiments in which ultrasonic transducers 11, 21, 31 or 12, 22, 32 are arranged both in the first housing part 41 and in the second housing part 42 (see for example FIG. 2 and FIG. 3), is the signal connection between the control device 10 arranged in the second housing part 42 and the ultrasonic transducers 11, 21, 31 arranged in the first housing part 41. Since the two housing parts 41 and 42 are arranged so that they can be rotated or pivoted relative to each other, the problem arises as to how a safe and reliable signal connection between the ultrasonic transducers 11, 21, 31 and the control device 10 can be realized.

According to one aspect of the invention, the joint 43 is used for this signal connection, as explained below with reference to FIG. 22. FIG. 22 shows an embodiment of the articulated connection of the two housing parts 41 and 42 in a section through an axis of rotation D of the joint 43. In the following, it is assumed without limitation to the generality that the ultrasonic transducers 11, 21, 31 are arranged in the first housing part 41 and the ultrasonic transducers 12, 22, 32 are arranged in the second housing part 42. The ultrasonic transducers 11, 12, 21, 22, 31, 32 cannot be seen in the representation of FIG. 22.

Since the ultrasonic transducers 12, 22, 32 are arranged in the same housing part 42 as the control device 10, their signal connection with the control device 10 is unproblematic and therefore requires no further explanation.

For the signal connection of the ultrasonic transducers 11, 21, 31 arranged in the first housing part 41, the joint 43 comprises a first joint part 431 and a second joint part 432, wherein the first joint part 431 is connected to the first housing part 41 in a torque-proof manner and the second joint part 432 is connected to the second housing part 42 in a torque-proof manner, and wherein the first joint part 431 and the second joint part 432 are designed and arranged in such a way that the signal lines 11a, 21a, 31a can be guided from the ultrasonic transducers 11, 21, 31 arranged in the first housing part 41 through the interior of the joint parts 431, 432 to the second housing part 42.

In the embodiment represented in FIG. 22, the joint 43 has the axis of rotation D, around which the two housing parts 41 and 42 can be rotated or pivoted relative to each other. The axis of rotation D is parallel to the center axis M of the measuring channel 3. The joint 43 comprises two substantially cylindrical pins 433 which extend into the housing 4 from the two ends of the housing 4, as seen in flow direction A, in the direction of the axis of rotation D. For this purpose, an opening is disposed at each of these two ends of the housing 4 in the second housing part 42, through which the respective pin 433 extends. Each pin 433 has a head 434 with which the respective pin 433 abuts on the respective end of the housing 4, preferably sealingly. Each pin 433 is arranged in such a way that its longitudinal axis lies on the axis of rotation D.

Seen in the direction of the axis of rotation D, the first joint part 431 and the second joint part 432 are arranged side by side between the two pins 433. Each joint part 431, 432 has a cylindrical area 435 or 436, the axis of which is located on the axis of rotation D in each case. One of the two pins 433 engages in the bottom of the cylindrical area 435 of the first joint part 431 and the other pin 433 engages in the bottom of the cylindrical area 436 of the second joint part 432. Furthermore, the two cylindrical areas 435 and 436 engage with each other on their open side facing away from the respective bottom. This is designed, for example, in such a way that the cylindrical area 436 of the second joint part 432 has an annular recess in its wall at its end facing away from the bottom, in which the cylindrical area 435 of the first joint part 431 engages with the end facing away from its bottom, so that the two cylindrical areas 435 and 436 overlap with respect to the direction of the axis of rotation D. In the area where the two cylindrical areas 435 and 436 overlap, a seal is disposed between the two cylindrical areas 435 and 436, for example an O-ring 439 inserted in an annular groove.

The first joint part 431 further has a hollow first extension piece 437 which extends from the cylindrical area 435 substantially perpendicular to the axis of rotation D into the first housing part 41 in the direction of the measuring channel 3, so that the first extension piece 437 can receive the signal lines 11a, 21a, 31a coming from the ultrasonic transducers 11, 21, 31 (see also FIG. 2). The hollow first extension piece 437 of the first joint part 431 is connected to the first housing part 41 in a torque-proof manner in the sense that the first joint part 431 cannot be rotated about the axis of rotation D relative to the first housing part 41. This means that if the first joint part 431 rotates around the axis of rotation D, the first housing part 41 will inevitably rotate around the axis of rotation D.

The second joint part 432 further has a hollow second extension piece 438 which extends from the cylindrical area 436 substantially perpendicular to the axis of rotation D into the second housing part 42 to a cavity 421 in the second housing part 42, in which the control device 10 is arranged. The hollow second extension piece 438 of the second joint part 432 is connected to the second housing part 42 in a torque-proof manner in the sense that the second joint part 432 cannot be rotated about the axis of rotation D relative to the second housing part 42. This means that if the second joint part 432 rotates around the axis of rotation D, the second housing part 42 will inevitably rotate around the axis of rotation D.

Thus, the signal lines 11a, 21a, 31a coming from the ultrasonic transducers 11, 21, 31 arranged in the first housing part 41 can be guided through the hollow first extension piece 437 into the cylindrical area 435 of the first joint part 431 and from there through the cylindrical area 436 of the second joint part 432 as well as through the hollow second extension piece 438 into the cavity 421 and can there be connected to the control device 10. This is symbolically represented in FIG. 22 by the dotted line 11a; 21a; 31a.

The first housing part 41 further has two annular eyelets 411, which are preferably designed in one piece with the first housing part 41. In the assembled state, the openings of the eyelets 411 are aligned with the two openings in the second housing part 42 through which the two pins 433 extend, so that the respective pin 433 extends from the respective end of the housing 4 through the respective opening in the second housing part 42 and the opening of the respective eyelet 411 to the first joint part 431 or to the second joint part 432. With respect to the direction of the axis of rotation D, the two joint parts 431 and 432 are arranged between the two eyelets 411.

A screw 15 or another fixing means or device 15 is further disposed in the second housing part 42 with which the control device 10 can be fixed in the cavity 421. In the embodiment represented in FIG. 22, the control device 10 is clamped between the screw 15 and the connection 48 screwed into the housing 4.

What is claimed:

1. An ultrasonic measuring device for the measurement on a fluid flowing in a pipe, the ultrasonic measuring device comprising:
   a closable housing having a continuous measuring channel with a center axis defining a flow direction, the housing configured to be releasable attached to the pipe such that in a closed state of the housing, the measuring channel is capable of receiving the pipe and fixing the pipe with respect to the housing, so that the fluid can flow through the measuring channel in the flow direction; and
   at least four ultrasonic transducers disposed in the housing and configured to respectively emit and receive ultrasonic signals, the at least four ultrasonic transducers including at least two first ultrasonic transducers and two second ultrasonic transducers, the first ultrasonic transducers forming a first pair of transducers and defining a first measuring section via which the two first ultrasonic transducers are capable of exchanging ultrasonic signals with each other, and the two second ultrasonic transducers forming a second pair of transducers and defining a second measuring section via which the two second ultrasonic transducers are capable of exchanging ultrasonic signals with each other, and the ultrasonic transducers being arranged and aligned such that both the first measuring section and the second measuring section each extend obliquely to the flow direction, the ultrasonic transducers being arranged and aligned such that a first measuring plane being defined by the center axis of the measuring channel and the first measuring section is different from a second measuring plane being defined by the center axis of the measuring channel and the second measuring section, the housing including a first housing part and with a second housing part, the first housing part and the second housing part being connected to each other in an articulated manner by a joint and together bounding the measuring channel in the closed state of the housing, and the joint comprising a first joint part and a second joint part, the first joint part connected to the first housing part in a torque-proof manner, and the second joint part connected to the second housing part in a torque-proof manner, and the first joint part and the second joint part configured and arranged such that at least one signal line is capable of being guided from the first housing part through the interior of the first and second joint parts to the second housing part.

2. The ultrasonic measuring device according to claim 1, wherein the at least four ultrasonic transducers includes at least six ultrasonic transducers, including the two first ultrasonic transducers, the two second ultrasonic transducers and two third ultrasonic transducers, the third ultrasonic transducers forming a third pair of transducers and defining a third measuring section via which the two third ultrasonic transducers are capable of exchanging ultrasonic signals with each other, and the third ultrasonic transducers arranged and aligned such that a third measuring plane being defined by the center axis of the measuring channel and the third measuring section is different from the first measuring plane or different from the second measuring plane.

3. The ultrasonic measuring device according to claim 2, wherein the third measuring plane is different from the first measuring plane and different from the second measuring plane.

4. The ultrasonic measuring device according to claim 2, wherein the two third ultrasonic transducers are arranged and aligned such that the third measuring section extends perpendicular to the center axis of the measuring channel.

5. The ultrasonic measuring device according to claim 1, wherein the measuring channel has an n-cornered cross-section perpendicular to the center axis in the closed state of the housing, and is bounded by n channel surfaces, n being an integer which is greater than or equal to four.

6. The ultrasonic measuring device according to claim 5, wherein the ultrasonic transducers are arranged and aligned so as to be capable of applying ultrasonic signals to at least two different and non-parallel channel surfaces.

7. The ultrasonic measuring device according claim 5, wherein the ultrasonic transducers are arranged and aligned so as to be capable of applying ultrasonic signals to a different channel surface.

8. The ultrasonic measuring device according to claim 5, wherein the ultrasonic transducers are arranged and aligned such that each ultrasonic transducer is capable of applying ultrasonic signals to a different channel surface.

9. The ultrasonic measuring device according to claim 5, wherein a number of ultrasonic transducers is equal to a number of channel surfaces.

10. The ultrasonic measuring device according to claim 1, wherein the measuring channel has an n-cornered cross-section perpendicular to the center axis in the closed state of the housing, and is bounded by n channel surfaces, n being equal to six or equal to eight.

11. The ultrasonic measuring device according to claim 1, wherein at least two of the ultrasonic transducers each include a curved emitting and receiving surface.

12. The ultrasonic measuring device according to claim 1, wherein the ultrasonic measuring device is a clamping device for a clamping connection with the pipe.

13. The ultrasonic measuring device according to claim 12, wherein one of the first pair of the ultrasonic transducers and one of the second pair of ultrasonic transducers is arranged in the first housing part and the other of the first pair of ultrasonic transducers and the other of the second pair of ultrasonic transducers is arranged in the second housing part.

14. The ultrasonic measuring device according to claim 1, wherein the measuring channel has, in the closed state of the housing, an entrance area, a central area and an exit area, arranged one behind the other when viewed in the flow direction, the entrance area and the exit area each having a circular cross-section perpendicular to the center axis, the central area having an n-cornered cross-section perpendicular to the center axis, n being an integer greater than or equal to four, and the n-cornered cross-section of the central area continuously merges into the circular cross-section of both the entrance area and the exit area.

* * * * *